United States Patent
Lu et al.

(10) Patent No.: US 12,348,437 B2
(45) Date of Patent: Jul. 1, 2025

(54) COMMUNICATION METHOD BASED ON USER-MODE PROTOCOL STACK, AND CORRESPONDING APPARATUS

(71) Applicant: HUAWEI TECHNOLOGIES CO., LTD., Guangdong (CN)

(72) Inventors: Zhihao Lu, Nanjing (CN); Liming Huang, Nanjing (CN); Changye Wu, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/589,783

(22) Filed: Feb. 28, 2024

(65) Prior Publication Data

US 2024/0205170 A1 Jun. 20, 2024

Related U.S. Application Data

(63) Continuation of application No. PCT/CN2022/115019, filed on Aug. 26, 2022.

(30) Foreign Application Priority Data

Aug. 31, 2021 (CN) .......................... 202111017331.2

(51) Int. Cl.
*G06F 15/16* (2006.01)
*H04L 49/109* (2022.01)
(Continued)

(52) U.S. Cl.
CPC .......... *H04L 49/355* (2013.01); *H04L 49/109* (2013.01); *H04L 49/901* (2013.01)

(58) Field of Classification Search
CPC ... H04L 49/355; H04L 49/109; H04L 49/901; H04L 69/32; H04L 69/321; H04L 43/10;
(Continued)

(56) References Cited

U.S. PATENT DOCUMENTS

| | | | |
|---|---|---|---|
| 2014/0304499 A1* | 10/2014 | Gopinath | H04L 63/168 713/151 |
| 2016/0359681 A1* | 12/2016 | McGleenon | H04L 47/193 |
| 2020/0314181 A1* | 10/2020 | Eran | H04L 67/10 |

OTHER PUBLICATIONS

Github.com [online], "F-stack," Oct. 18, 2024, retrieved on Nov. 28, 2024, retrieved from URL<https://github.com/F-Stack/f-stack#introduction>, 8 pages.

* cited by examiner

*Primary Examiner* — Razu A Miah
(74) *Attorney, Agent, or Firm* — Fish & Richardson P.C.

(57) ABSTRACT

Example communication methods and systems based on a user-mode protocol stack are provided. One example method is applied to a service side, where the service side includes an application layer, the user-mode protocol stack, and a hardware layer. A target application of the application layer corresponds to at least one W thread. The example method includes obtaining, by using a routing module, a first correspondence and a second correspondence, where the first correspondence includes a correspondence between a listen file descriptor (FD) of a first W thread and a plurality of shadow FDs, and the second correspondence includes a correspondence between a target N thread and a connection FD. Communication with a client is performed using the routing module based on the first correspondence and the second correspondence.

17 Claims, 16 Drawing Sheets

(51) Int. Cl.
*H04L 49/35* (2022.01)
*H04L 49/901* (2022.01)

(58) Field of Classification Search
CPC . H04L 9/40; H04L 69/16; H04L 69/30; G06F 9/54
See application file for complete search history.

| FD routing table | |
|---|---|
| Connection FD 1 | N thread 1 |
| Connection FD 2 | N thread 2 |
| ... | ... |
| Connection FD n | N thread n |

TO FIG. 7B

| Receive queue and transmit queue of the FD 2 | |
|---|---|
| Receive queue 2 | Transmit queue 2 |
|  | Memory address of second data |

| FD routing table | |
|---|---|
| Connection FD 1 | N thread 1 |
| Connection FD 2 | N thread 2 |
| ... | ... |
| Connection FD n | N thread n |

TO FIG. 8B

| Receive queue and transmit queue of the FD 2 | |
|---|---|
| Receive queue 2 | Transmit queue 2 |
| Memory address of data | Memory address of data |

| FD routing table | |
|---|---|
| Connection FD 1 | N thread 1 |
| Connection FD 2 | N thread 2 |
| ... | ... |
| Connection FD n | N thread n |

TO FIG. 9B

| Receive queue and transmit queue of the FD 2 | |
|---|---|
| Receive queue 2 | Transmit queue 2 |
| | Memory address of first data |

COMMUNICATION METHOD BASED ON USER-MODE PROTOCOL STACK, AND CORRESPONDING APPARATUS

CROSS-REFERENCE TO RELATED APPLICATIONS

This application is a continuation of International Application No. PCT/CN2022/115019, filed on Aug. 26, 2022, which claims priority to Chinese Patent Application No. 202111017331.2, filed on Aug. 31, 2021. The disclosures of the aforementioned applications are hereby incorporated by reference in their entireties.

TECHNICAL FIELD

This application relates to the field of computer technologies, and specifically, to a communication method based on a user-mode protocol stack, and a corresponding apparatus.

BACKGROUND

In a computer system, interaction between an application thread and network hardware is usually implemented based on a kernel protocol stack or a user-mode protocol stack. In recent years, an input/output (I/O) capability of network hardware has been greatly developed. Based on a kernel protocol stack, a context needs to be frequently switched between a kernel mode and a user mode in a process of processing I/O data. Therefore, a capability of an existing kernel protocol stack cannot fully implement the I/O capability of the network hardware. In a plurality of network I/O acceleration technologies, a user-mode protocol stack is a common and effective technical means.

The user-mode protocol stack is designed to enable an application to more directly interact with hardware by bypassing (bypassing) a kernel. In a current user-mode protocol stack, a user-mode protocol stack thread and an application thread are usually designed to be in a same thread context. This can avoid thread switching overheads. However, in this manner of designing the user-mode protocol stack, the user-mode protocol stack thread is bound to the application thread. This results in poor universality.

SUMMARY

Embodiments of this application provide a communication method based on a user-mode protocol stack, to improve universality of the user-mode protocol stack. Embodiments of this application further provide a corresponding device, a computer-readable storage medium, a computer program product, and the like.

According to a first aspect of this application, a communication method based on a user-mode protocol stack is provided, and is applied to a service side. The service side includes an application layer, the user-mode protocol stack, and a hardware layer. A target application of the application layer corresponds to at least one W thread, and the W thread is a thread for processing data of the target application. The user-mode protocol stack includes a plurality of N threads, a routing module, and transmission control protocol hash tables that are in a one-to-one correspondence with the plurality of N threads. The N thread is a user-mode protocol stack thread. The hardware layer includes a plurality of non-uniform memory access NUMA nodes and a network adapter. The plurality of N threads are in a one-to-one correspondence with the plurality of NUMA nodes. The method includes: obtaining a first correspondence by using the routing module, where the first correspondence includes a correspondence between a listen file descriptor (FD) of a first W thread and a plurality of shadow FDs, the plurality of shadow FDs are generated in a one-to-one manner for the plurality of N threads, and the first W thread is one of the at least one W thread; obtaining a second correspondence by using the routing module, where the second correspondence includes a correspondence between a target N thread and a connection FD, and the target N thread is an N thread selected by the network adapter from the plurality of N threads when a communication connection to a client is established; and communicating with the client by using the routing module based on the first correspondence and the second correspondence.

The communication method based on a user-mode protocol stack provided in this application may be applied to a non-uniform memory access (NUMA) system. The NUMA system usually includes a plurality of NUMA nodes (nodes), and each NUMA node usually includes a plurality of processing cores, memory, an input/output (I/O) resource, and the like. In this application, the processing core may also be referred to as a central processing unit (CPU) core, or a CPU for short.

In this application, the service side may include a server, a virtual machine (VM), or a container (container). The client may include a terminal device, a virtual machine, or a container.

In this application, the application layer may include a plurality of applications, the target application may be one of the applications, and the target application may correspond to one W thread or a plurality of W threads. If the target application corresponds to one W thread, the W thread may complete a plurality of functions such as listening, waiting, and data processing. If the target application corresponds to a plurality of W threads, the plurality of W threads each may complete functions such as listening, waiting, and data processing. Certainly, one thread may alternatively complete two or more functions. For example, one W thread completes both functions of waiting and data processing.

"A plurality of" in this application means two or more, or may be described as at least two.

In this application, in the user-mode protocol stack, each N thread has a transmission control protocol (TCP) hash table, and the TCP hash table includes information required by the N thread to execute a TCP protocol. Each N thread corresponds to one NUMA node. A correspondence between an N thread and a NUMA node may be configured during initialization of the service side. The NUMA node usually includes a plurality of processing cores, and the N thread may be bound to one of the processing cores. The routing module may be a software package having a routing function, for example, a software development kit (SDK) or a data plane development kit (DPDK). The routing module includes the first correspondence and the second correspondence. The first correspondence may be referred to as an FD shadow table, and is a correspondence between the listen FD of the first W thread that initiates a listen operation and a shadow FD corresponding to each N thread. If there are n N threads, a form of the shadow table may be that the listen FD corresponds to a shadow FD 1, a shadow FD 2, . . . , and a shadow FD n. The shadow FD is an FD that is not sensed by an operating system, and the operating system senses only the listen FD of the first W thread. The second correspondence may be referred to as a routing table. The routing table records a correspondence between each N thread and a corresponding connection FD, and the correspondence includes the correspondence between the target N thread and the corresponding connection FD.

In this application, the listen FD is an FD related to the listen operation of the first W thread, and the connection FD is an FD generated by the N thread to establish a TCP connection between the client and the service side. One TCP connection has one connection FD. The connection FD corresponds to the N thread that establishes the TCP connection. In this application, the N thread that establishes the TCP connection is referred to as a target N thread.

In this application, in a process in which the client and the service side perform TCP communication, the service side may implement, by using the first correspondence (that is, the shadow table) in the routing module, corresponding association search from an N thread to a W thread, to transfer a connection FD; and then, may determine by using the routing module and the second correspondence (the routing table), a target N thread used in the communication process, to complete the communication process. It can be learned from the foregoing solution that, in this application, a binding relationship between the W thread and the N thread does not need to be established in advance, and a plurality of N threads do not need to share one TCP hash table either. This can decouple the W thread from the N thread, and improve universality of the user-mode protocol stack. In addition, because no kernel operation is involved, a context does not need to be switched between the W thread and the N thread, so that performance of the user-mode protocol stack is further improved.

In a possible implementation of the first aspect, the step of obtaining a first correspondence by using the routing module includes: receiving, by using the routing module, a listen operation initiated by the first W thread, and generating the listen FD for the first W thread; initiating a listen operation to each of the plurality of N threads by using the routing module, to obtain the plurality of shadow FDs corresponding to the plurality of N threads, where the plurality of shadow FDs are in a one-to-one correspondence with the plurality of N threads; and establishing a correspondence between the listen FD and the plurality of shadow FDs by using the routing module, to obtain the first correspondence.

In this possible implementation, the service side periodically initiates a listen operation for the target application by using the first W thread, to listen to whether there is related data of the target application that needs to be received. The first W thread initiates a listen operation, and the routing module initiates a listen operation to each N thread based on the listen operation. In this way, a shadow table from the first W thread to each N thread may be established for a subsequent communication process, and the W thread and the N thread do not need to be bound in advance. This improves universality of the user-mode protocol stack.

In a possible implementation of the first aspect, the network adapter includes at least one network adapter queue, and the step of obtaining a second correspondence by using the routing module includes: obtaining, by using the routing module, the connection FD generated by the target N thread to establish the communication connection, where the communication connection is established based on a link establishment request that is sent by the client and that is received by a first network adapter queue, and the first network adapter queue is one of the at least one network adapter queue; and establishing the correspondence between the target N thread and the connection FD by using the routing module, to obtain the second correspondence.

In this possible implementation, the network adapter usually includes a plurality of network adapter queues, and one network adapter queue corresponds to one N thread. A correspondence between a network adapter queue and an N thread is not preconfigured, and may be determined in a process of establishing a communication connection. If the first network adapter queue in the network adapter receives the link establishment request of the client, and the network adapter selects the target N thread for the link establishment request based on logic of the network adapter, the second correspondence between the first network adapter queue and the target N thread is established. The second correspondence is stored in the routing module. In this way, a corresponding target N thread may be determined by using the routing module for a communication relationship subsequently generated by using the connection FD, to complete a subsequent communication process. This improves communication flexibility.

In a possible implementation of the first aspect, the step of communicating with the client by using the routing module based on the first correspondence and the second correspondence includes: transferring, by using the routing module, the connection FD corresponding to the target N thread to the first W thread based on a correspondence that is in the first correspondence and that is between a shadow FD corresponding to the target N thread and the listen FD corresponding to the first W thread; and communicating with the client by using the routing module based on the connection FD and the second correspondence.

In this possible implementation, the connection FD may be transferred to the first W thread by using the shadow table. In this way, a related W thread of the target application may use the connection FD to perform another subsequent operation. In addition, the routing module may determine, based on the connection FD in the another operation initiated by the W thread, a corresponding target N thread to perform the related operation, to complete a communication process.

In a possible implementation of the first aspect, when there are a plurality of W threads corresponding to the target application, the communicating with the client by using the routing module based on the connection FD and the second correspondence includes: receiving, by using the routing module, a poll_wait/extended epoll_wait event initiated by a second W thread, where the poll/epoll event includes the connection FD, the connection FD is transferred by the first W thread to the second W thread, the second W thread enters a sleep state after initiating the poll/epoll event, and the second W thread is one of the plurality of W threads corresponding to the target application; determining, by using the routing module based on the second correspondence, that the connection FD corresponds to the target N thread, to wait for a wake-up event related to the target thread; and after the second W thread is woken up, performing, by using the routing module based on the second correspondence, a read operation or a write operation related to the target N thread.

In this possible implementation, when there are a plurality of W threads corresponding to the target application, for example, in a thread model of MySQL, a master thread is responsible for completing listening (listening), a new TCP connection is established by an auth thread, and a final SQL request is completed by a worker thread. In this case, the first W thread needs to transfer the connection FD to the second W thread, and the second W thread triggers the poll/epoll event, and then enters the sleep state, to wait for the wake-up event of the target thread that occurs after related data arrives. After the second W thread is woken up, a subsequent communication process is performed. In this way, power consumption of the second W thread in an active state can be reduced, and the communication process is not affected. This improves system performance.

In a possible implementation of the first aspect, the method further includes: waking up the second W thread by using a wake-up proxy thread associated with the target N thread.

In this possible implementation, the second W thread is woken up by using the wake-up proxy thread associated with the target N thread. In this way, the target N thread can be prevented from entering a kernel mode, so that the target N thread can be always in a running state. This reduces a network delay in the communication process.

In a possible implementation of the first aspect, after the determining, based on the second correspondence, that the connection FD corresponds to the target N thread, the method further includes: allocating a receive queue and a transmit queue to the connection FD in memory of a NUMA node corresponding to the target N thread, where the receive queue is used to record a memory address of data related to the read operation, and the transmit queue is used to record a memory address of data related to the write operation.

In this possible implementation, the connection FD is associated with the receive queue and the transmit queue, so that the corresponding target N thread can be quickly associated. This improves system performance in the communication process.

In a possible implementation of the first aspect, the step of performing, by using the routing module based on the second correspondence, a read operation related to the target N thread includes: receiving, by using the routing module, a read operation initiated by the second W thread or a third W thread, where the read operation carries the connection FD, the third thread is one of the plurality of W threads corresponding to the target application, and when the third thread initiates the read operation, the connection FD is transferred by the second W thread to the third W thread; obtaining, by using the routing module based on the connection FD, a memory address of first data from the receive queue associated with the connection FD, where the first data is data received from the client by the first network adapter queue associated with the target N thread, and the first network adapter queue is a network adapter queue that receives the link establishment request sent by the client; and obtaining the first data based on the memory address of the first data, and transferring the first data to the second thread or the third W thread for processing.

In this possible implementation, a read operation process may be directly initiated by the second W thread, or may be initiated by the third W thread after the second W thread transfers the connection FD to the third W thread. In a MySQL scenario, the second W thread may be an auth thread, and the third W thread may be a worker thread. In the read operation process, after receiving the first data sent by the client, the first network adapter queue sends the first data, for storage, to the memory of the NUMA node associated with the corresponding target N thread, where the memory address of the first data in the memory is stored in the receive queue associated with the connection FD. In this way, after the second W thread or the third W thread initiates the read operation, the target N thread may obtain the memory address of the first data from the corresponding receive queue based on the connection FD in the read operation, then read the first data from the memory, and transfer the first data to a buffer of the second W thread or the third W thread; and the second W thread or the third W thread processes the first data. In a process in which the service side reads data of the client, the routing module determines the corresponding target N thread by using the connection FD, to complete a corresponding processing process, so that data reading efficiency can be improved.

In a possible implementation of the first aspect, the step of performing, by using the routing module based on the second correspondence, a write operation related to the target N thread includes: receiving, by using the routing module, a write operation initiated by the second W thread or a third W thread, where the write operation carries the connection FD and second data, the third thread is one of the plurality of W threads corresponding to the target application, and when the third thread initiates the write operation, the connection FD is transferred by the second W thread to the third W thread; writing, by using the routing module based on the connection FD, the second data into the memory corresponding to the target N thread, and writing a memory address of the second data in the memory into the transmit queue corresponding to the connection FD; and when the target N thread obtains the memory address of the second data in the transmit queue through polling, sending the second data in the memory to the network adapter.

In this possible implementation, for a relationship between the second W thread and the third W thread, refer to a relationship in the foregoing read operation for understanding. In a write operation process, the routing module determines the corresponding target N thread based on the connection FD, writes the second data into the memory corresponding to the target N thread, and then writes the memory address of the second data into the transmit queue corresponding to the connection FD. In this way, after polling the memory address of the second data in the transmit queue, the target N thread sends the second data in the memory to the first network adapter queue in the network adapter, and the first network adapter queue sends the second data to the client.

In a possible implementation of the first aspect, before the performing a read operation or a write operation, the method further includes: binding the second W thread or the third W thread to a processing core in the NUMA node on which the target N thread is located.

In this possible implementation, the second W thread or the third W thread is bound to the processing core in the NUMA node on which the target N thread is located, so that a TCP communication process can be completed without a need of crossing NUMA nodes. The target N thread shares data in the memory with the second W thread and the third W thread, so that a communication speed is increased and a network delay is reduced.

In a possible implementation of the first aspect, the memory in the NUMA node corresponding to the target N thread is huge page memory.

In this possible implementation, a buffer search miss probability can be reduced by setting the huge page memory.

According to a second aspect of this application, a communication method based on a user-mode protocol stack is provided, and is applied to a client. The client includes an application layer, the user-mode protocol stack, and a hardware layer. A target application of the application layer corresponds to at least one W thread, and the W thread is a thread for processing data of the target application. The user-mode protocol stack includes a plurality of N threads, a routing module, and transmission control protocol hash tables that are in a one-to-one correspondence with the plurality of N threads. The N thread is a user-mode protocol stack thread. The hardware layer includes a plurality of non-uniform memory access NUMA nodes. The plurality of N threads are in a one-to-one correspondence with the plurality of NUMA nodes. The method includes: obtaining a target correspondence by using the routing module, where the target correspondence includes a correspondence between a connection file descriptor FD and a target N thread, the target N thread is an N thread selected by the routing module for a first W thread that initiates a connection operation, the first W thread is one of the at least one W thread, and the target N thread is one of the plurality of N threads; and communicating with a service side by using the routing module based on the target correspondence.

For a feature that is in the second aspect and that is the same as that in the first aspect, refer to the explanation of the first aspect for understanding. In the client, the correspondence between the connection FD and the target N thread is established by using the routing module. In this way, in a subsequent communication process, the corresponding target N thread may be determined based on the connection FD, and then a subsequent communication operation is performed, so that the W thread does not need to be bound to the N thread. This improves universality of the user-mode protocol stack. In addition, because no kernel operation is involved, a context does not need to be switched between the W thread and the N thread, so that performance of the user-mode protocol stack is further improved.

In a possible implementation of the second aspect, the step of obtaining a target correspondence by using the routing module includes: receiving, by using the routing module, the connection operation initiated by the first W thread, selecting the target N thread from the plurality of N threads for the connection operation, and generating the connection FD for the first W thread; and establishing the correspondence between the target N thread and the connection FD by using the routing module, to obtain the target correspondence.

In a possible implementation of the second aspect, the step of communicating with a service side by using the routing module based on the target correspondence includes: determining, by using the routing module based on the connection FD, a network adapter queue and a NUMA node that corresponds to the target N thread; and sending a link establishment request and first data to the service side by using the network adapter queue and the NUMA node that corresponds to the target N thread.

In a possible implementation of the second aspect, after the step of determining, based on the connection FD, a network adapter queue and a NUMA node that corresponds to the target N thread, the method further includes: allocating a transmit queue to the connection FD in memory of the NUMA node corresponding to the target N thread, where the transmit queue is used to record a memory address of data related to a write operation.

In a possible implementation of the second aspect, the step of sending first data to the service side by using the network adapter queue and the NUMA node that corresponds to the target N thread includes: receiving, by using the routing module, a write operation initiated by a second W thread, where the write operation carries the connection FD and the first data, the second thread is one of the plurality of W threads corresponding to the target application, and when the second thread initiates the write operation, the connection FD is transferred by the first W thread to the second W thread; writing, by using the routing module based on the connection FD, the first data into the memory corresponding to the target N thread, and writing a memory address of the first data in the memory into the transmit queue corresponding to the connection FD; and when the target N thread obtains the memory address of the first data in the transmit queue through polling, sending the first data in the memory to a network adapter.

In a possible implementation of the second aspect, before the write operation is performed, the method further includes: binding the second W thread to a processing core in the NUMA node on which the target N thread is located.

For a feature that is in any possible implementation of the second aspect and that is the same as that in any one of the first aspect or the possible implementations of the first aspect, refer to the explanation of any one of the first aspect or the possible implementations of the first aspect for understanding.

According to a third aspect of this application, a service side is provided. The service side has a function of implementing the method in any one of the first aspect or the possible implementations of the first aspect. The function may be implemented by hardware, or may be implemented by hardware executing corresponding software. The hardware or the software includes one or more modules corresponding to the foregoing function, for example, a first processing unit, a second processing unit, and a third processing unit. The three processing units may be implemented by one or more processing units.

According to a fourth aspect of this application, a client is provided. The client has a function of implementing the method in any one of the second aspect or the possible implementations of the second aspect. The function may be implemented by hardware, or may be implemented by hardware executing corresponding software. The hardware or the software includes one or more modules corresponding to the foregoing function, for example, a first processing unit and a second processing unit. The two units may be implemented by one processing unit.

According to a fifth aspect of this application, a computer device is provided. The computer device includes at least one processor, a memory, an input/output (I/O) interface, and computer-executable instructions that are stored in the memory and that can be run on the processor. When the computer-executable instructions are executed by the processor, the processor performs the method in any one of the first aspect or the possible implementations of the first aspect.

According to a sixth aspect of this application, a computer device is provided. The computer device includes at least one processor, a memory, an input/output (I/O) interface, and computer-executable instructions that are stored in the memory and that can be run on the processor. When the computer-executable instructions are executed by the processor, the processor performs the method in any one of the second aspect or the possible implementations of the second aspect.

According to a seventh aspect of this application, a computer-readable storage medium storing one or more computer-executable instructions is provided. When the one or more computer-executable instructions are executed by one or more processors, the one or more processors perform the method in any one of the first aspect or the possible implementations of the first aspect.

According to an eighth aspect of this application, a computer program product storing one or more computer-executable instructions is provided. When the one or more computer-executable instructions are executed by one or more processors, the one or more processors perform the method in any one of the second aspect or the possible implementations of the second aspect.

According to a ninth aspect of this application, a chip system is provided. The chip system includes at least one processor, and the at least one processor is configured to support a service side in implementing the function in any one of the first aspect or the possible implementations of the first aspect. In a possible design, the chip system may further include a memory. The memory is configured to store necessary program instructions and data of the service side. The chip system may include a chip, or may include a chip and another discrete device.

According to a tenth aspect of this application, a chip system is provided. The chip system includes at least one processor, and the at least one processor is configured to support a client in implementing the function in any one of the second aspect or the possible implementations of the second aspect. In a possible design, the chip system may further include a memory. The memory is configured to store necessary program instructions and data of the client. The chip system may include a chip, or may include a chip and another discrete device.

BRIEF DESCRIPTION OF DRAWINGS

FIG. 7A and FIG. 7B are a schematic diagram of another embodiment of a communication method based on a user-mode protocol stack according to an embodiment of this application;

FIG. 8A and FIG. 8B are a schematic diagram of another embodiment of a communication method based on a user-mode protocol stack according to an embodiment of this application;

FIG. 9A and FIG. 9B are a schematic diagram of another embodiment of a communication method based on a user-mode protocol stack according to an embodiment of this application;

DESCRIPTION OF EMBODIMENTS

The following describes embodiments of this application with reference to the accompanying drawings. It is clear that the described embodiments are merely a part rather than all of embodiments of this application. A person of ordinary skill in the art may learn that, with development of technologies and emergence of new scenarios, the technical solutions provided in embodiments of this application are also applicable to similar technical problems.

In the specification, claims, and accompanying drawings of this application, the terms "first", "second", and the like are intended to distinguish between similar objects but do not necessarily indicate a specific order or sequence. It should be understood that the data termed in such a way are interchangeable in proper circumstances, so that embodiments described herein can be implemented in other orders than the order illustrated or described herein. In addition, the terms "include", "have", and any other variant thereof are intended to cover a non-exclusive inclusion. For example, a process, method, system, product, or device that includes a list of steps or units is not necessarily limited to those steps or units that are expressly listed, but may include other steps or units that are not expressly listed or are inherent to the process, method, product, or device.

Embodiments of this application provide a communication method based on a user-mode protocol stack, to improve universality of the user-mode protocol stack. Embodiments of this application further provide a corresponding device, a computer-readable storage medium, a computer program product, and the like. The following separately provides detailed descriptions.

Figure 1:
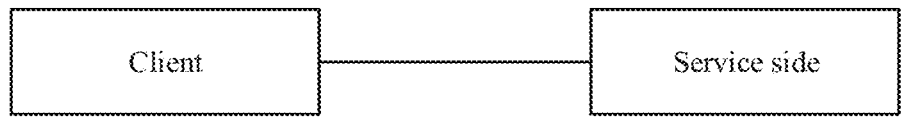
FIG. 1 is a schematic diagram of a scenario of communication between a service side and a client.

The communication method based on a user-mode protocol stack provided in embodiments of this application may be applied to a scenario of communication between a client and a service side shown in FIG. 1. The service side and the client may communicate with each other by using a transmission control protocol (TCP). The service side may include a server, a virtual machine (VM), or a container (container). The client may include a terminal device, a virtual machine, or a container.

The server may be a physical machine in any form.

The terminal device (which may also be referred to as user equipment (UE)) is a device having a wireless transceiver function, and may be deployed on land, including an indoor or outdoor device, a handheld device, or a vehicle-mounted device, may be deployed on water (for example, on a ship), or may be deployed in the air (for example, on an airplane, a balloon, and a satellite). The terminal device may be a personal computer (PC), a mobile phone (mobile phone), a tablet computer (pad), a computer having a wireless transceiver function, a virtual reality (VR) terminal, an augmented reality (AR) terminal, a wireless terminal in industrial control (industrial control), a wireless terminal in self driving (self driving), a wireless terminal in telemedicine (remote medical), a wireless terminal in a smart grid (smart grid), a wireless terminal in transportation safety (transportation safety), a wireless terminal in a smart city (smart city), a wireless terminal in a smart home, a wireless terminal in the internet of things (IOT), or the like.

Both the client and the service side in this application are computer devices. A resource configuration manner of the computer device uses a structure of a non-uniform memory access (NUMA) system, and a user-mode protocol stack is installed on the computer device.

Figure 2:
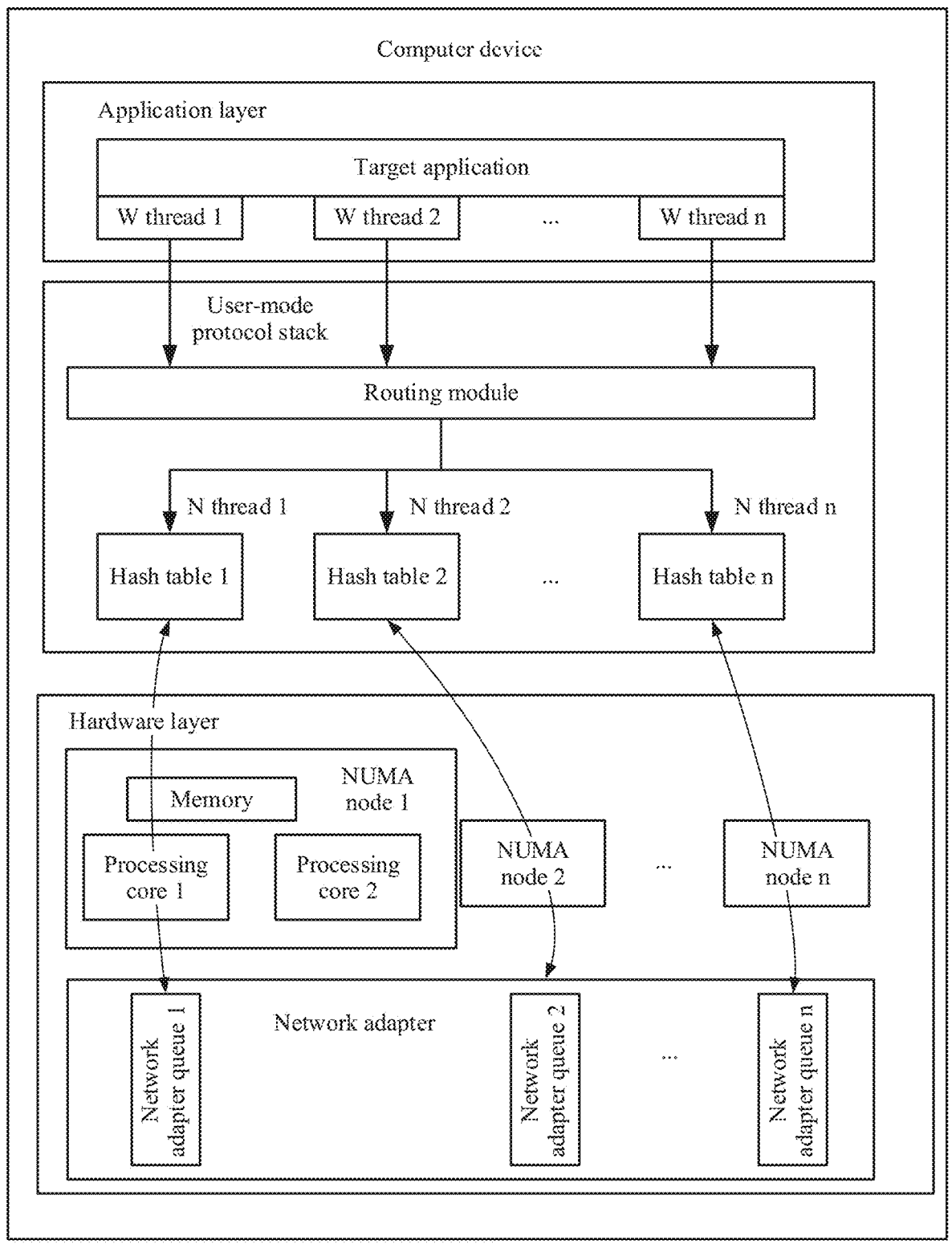
FIG. 2 is a schematic diagram of a structure of a computer device according to an embodiment of this application.

For both the client and the service side, a system structure of the computer device provided in embodiments of this application may be understood with reference to FIG. 2.

As shown in FIG. 2, a system structure of a computer device provided in an embodiment of this application includes an application layer, a user-mode protocol stack, and a hardware layer.

The application layer may include one or more applications, a target application may be one of the applications, the target application corresponds to at least one W thread, and the W thread is a thread for processing data of the target application.

The user-mode protocol stack includes a plurality of N threads, a routing module, and TCP hash tables that are in a one-to-one correspondence with the plurality of N threads. In other words, each N thread has one TCP hash table (Hash Table), and the TCP hash table includes information required by the N thread to execute a TCP protocol. The routing module may be a software package having a routing function, for example, a software development kit (SDK) or a data plane development kit (DPDK). The routing module is responsible for hook interface operations (operations including socketing socket( ), listening listen( ), binding bind( ), connection connect( ), a poll_wait( ) event, an extended epoll_wait( ) event, sending send( ), and receiving recv( )). The routing module may implement routing between W and N based on a correspondence. The TCP hash table is used to maintain and manage TCP-related information, including establishing Establish, binding bind, listening listen, a TCP control block (TCB), and an FD.

The hardware layer includes a plurality of non-uniform memory access NUMA nodes and a network adapter. Each NUMA node usually includes a plurality of processing cores and memory, and the memory may be huge page memory. The network adapter may include a plurality of network adapter queues. The processing core may also be referred to as a central processing unit (CPU) core, or a CPU for short.

During initialization or resource configuration for the computer device, one N thread may be configured for each NUMA node. A relationship between a network adapter queue and an N thread may be preconfigured, or may be selected by the network adapter based on logic of the network adapter in a process of establishing a communication connection.

It should be noted that a portable operating system interface (POSIX) may be configured between the application layer and the user-mode protocol stack, and the routing module may hook the POSIX to determine an operation type, for example, a listen operation, a connection operation, a read operation, or a write operation.

A correspondence between an N thread, a NUMA node, and a network adapter queue shown in FIG. 2 is merely an example. In actual application, the correspondence between an N thread, a NUMA node, and a network adapter queue shown in FIG. 2 is not limited thereto.

Correspondences maintained in the routing module shown in FIG. 2 are slightly different on the service side and the client, but both involve a file descriptor (FD). The following first describes the FD.

In a Linux system, everything is considered as a file. When a process or a thread opens an existing file or creates a file, a kernel returns an FD to the process or thread. The FD is an index created by the kernel to efficiently manage the opened file, and is used to point to the opened file. For all system calls for performing I/O operations, FDs need to be input. When an I/O operation needs to be performed, an FD is input as a parameter. A file descriptor table is searched for an entry corresponding to the FD, to obtain a handle of the corresponding opened file; and a system file descriptor table is searched, based on pointing of the file handle, for an inode to which the file points, to locate a real location of the file and perform the I/O operation.

The following describes, from a perspective of each of the service side and the client, a correspondence maintained by the routing module.

Figure 3:
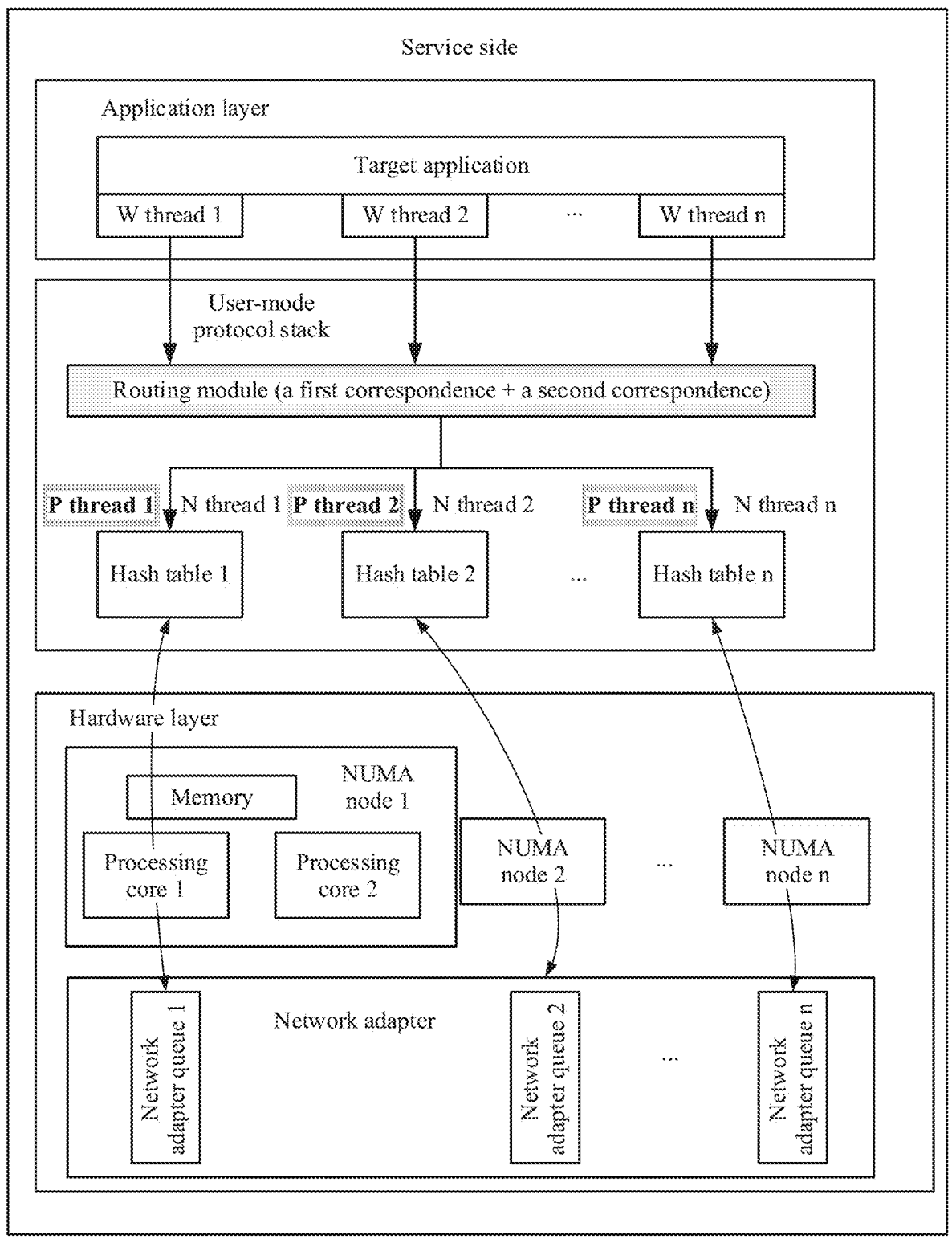
FIG. 3 is a schematic diagram of a structure of a service side according to an embodiment of this application.

As shown in FIG. 3, on the service side, the routing module maintains a first correspondence and a second correspondence. The first correspondence may be referred to as a file descriptor (FD) shadow table, and is a correspondence between a listen FD of a first W thread that initiates a listen operation and a shadow FD corresponding to each N thread. If there are n N threads, a form of the FD shadow table may be that the listen FD corresponds to a shadow FD 1, a shadow FD 2, . . . , and a shadow FD n. The shadow FD is an FD that is not sensed by an operating system, and the operating system senses only the listen FD of the first W thread. The second correspondence may be referred to as an FD routing table. The FD routing table records a correspondence between each N thread and a corresponding connection FD, and the correspondence includes a correspondence between a target N thread and a corresponding connection FD. The first W thread is one of the at least one W thread, and the target N thread is one of the plurality of N threads.

In a communication process, the service side obtains the first correspondence and the second correspondence by using the routing module, and communicates with the client by using the routing module based on the first correspondence and the second correspondence.

In this embodiment of this application, the listen FD is an FD related to the listen operation of the first W thread, and the connection FD is an FD generated by the N thread to establish a TCP connection between the client and the service side. One TCP connection has one connection FD. The connection FD corresponds to the N thread that establishes the TCP connection. In this embodiment of this application, the N thread that establishes the TCP connection is referred to as a target N thread.

A process of obtaining the first correspondence may include: receiving, by using the routing module, the listen operation initiated by the first W thread, and generating the listen FD for the first W thread; initiating a listen operation to each of the plurality of N threads by using the routing module, to obtain a plurality of shadow FDs corresponding to the plurality of N threads, where the plurality of shadow FDs are in a one-to-one correspondence with the plurality of N threads; and establishing a correspondence between the listen FD and the plurality of shadow FDs by using the routing module, to obtain the first correspondence.

A process of obtaining the second correspondence may include: obtaining, by using the routing module, the connection FD generated by the target N thread to establish the communication connection, where the communication connection is established based on a link establishment request that is sent by the client and that is received by a first network adapter queue, and the first network adapter queue is one of at least one network adapter queue; and establishing the correspondence between the target N thread and the connection FD by using the routing module, to obtain the second correspondence.

The foregoing process of communicating with the client based on the first correspondence and the second correspondence may include: transferring, by using the routing module, the connection FD corresponding to the target N thread to the first W thread based on a correspondence that is in the first correspondence and that is between a shadow FD corresponding to the target N thread and the listen FD corresponding to the first W thread; and communicating with the client by using the routing module based on the connection FD and the second correspondence.

When there are a plurality of W threads corresponding to the target application, the communicating with the client by using the routing module based on the connection FD and the second correspondence may include: receiving, by using the routing module, a poll_wait/extended epoll_wait event initiated by a second W thread, where the poll/epoll event includes the connection FD, the connection FD is transferred by the first W thread to the second W thread, the second W thread enters a sleep state after initiating the poll/epoll event, and the second W thread is one of the plurality of W threads corresponding to the target application; determining, by using the routing module based on the second correspondence, that the connection FD corresponds to the target N thread, to wait for a wake-up event related to the target thread; and after the second W thread is woken up, performing, by using the routing module based on the second correspondence, a read operation or a write operation related to the target N thread.

After the determining, based on the second correspondence, that the connection FD corresponds to the target N thread, the method may further include: allocating a receive queue and a transmit queue to the connection FD in memory of a NUMA node corresponding to the target N thread, where the receive queue is used to record a memory address of data related to the read operation, and the transmit queue is used to record a memory address of data related to the write operation.

The performing, by using the routing module based on the second correspondence, a read operation related to the target N thread may include: receiving, by using the routing module, a read operation initiated by the second W thread or a third W thread, where the read operation carries the connection FD, the third thread is one of the plurality of W threads corresponding to the target application, and when the third thread initiates the read operation, the connection FD is transferred by the second W thread to the third W thread; obtaining, by using the routing module based on the connection FD, a memory address of first data from the receive queue associated with the connection FD, where the first data is data received from the client by the first network adapter queue associated with the target N thread, and the first network adapter queue is a network adapter queue that receives the link establishment request sent by the client; and obtaining the first data based on the memory address of the first data, and transferring the first data to the second thread or the third W thread for processing.

The performing, by using the routing module based on the second correspondence, a write operation related to the target N thread may include: receiving, by using the routing module, a write operation initiated by the second W thread or a third W thread, where the write operation carries the connection FD and second data, the third thread is one of the plurality of W threads corresponding to the target application, and when the third thread initiates the write operation, the connection FD is transferred by the second W thread to the third W thread; writing, by using the routing module based on the connection FD, the second data into the memory corresponding to the target N thread, and writing a memory address of the second data in the memory into the transmit queue corresponding to the connection FD; and when the target N thread obtains the memory address of the second data in the transmit queue through polling, sending the second data in the memory to the network adapter.

Before the performing a read operation or a write operation, the method may further include: binding the second W thread or the third W thread to a processing core in the NUMA node on which the target N thread is located.

In addition, on the service side, the user-mode protocol stack may further include wake-up proxy threads. For example, a P thread 1, a P thread 2, . . . , and a P thread n in FIG. 3 are all wake-up proxy threads. Each N thread corresponds to one wake-up proxy thread. For example, an N thread 1 corresponds to the P thread 1, an N thread 2 corresponds to the P thread 2, . . . , and an N thread n corresponds to the P thread n. In this embodiment of this application, before the read operation or the write operation is performed, the second W thread is woken up by using a wake-up proxy thread associated with the target N thread.

In this application, in a process in which the client and the service side perform TCP communication, the service side may implement, by using the first correspondence (that is, the shadow table) in the routing module, corresponding association search from an N thread to a W thread, to transfer a connection FD; and then, may determine by using the routing module and the second correspondence (the routing table), a target N thread used in the communication process, to complete the communication process. It can be learned from the foregoing solution that, in this application, a binding relationship between the W thread and the N thread does not need to be established in advance, and a plurality of N threads do not need to share one TCP hash table either. This can decouple the W thread from the N thread, and improve universality of the user-mode protocol stack. In addition, because no kernel operation is involved, a context does not need to be switched between the W thread and the N thread, so that performance of the user-mode protocol stack is further improved.

Figure 4:
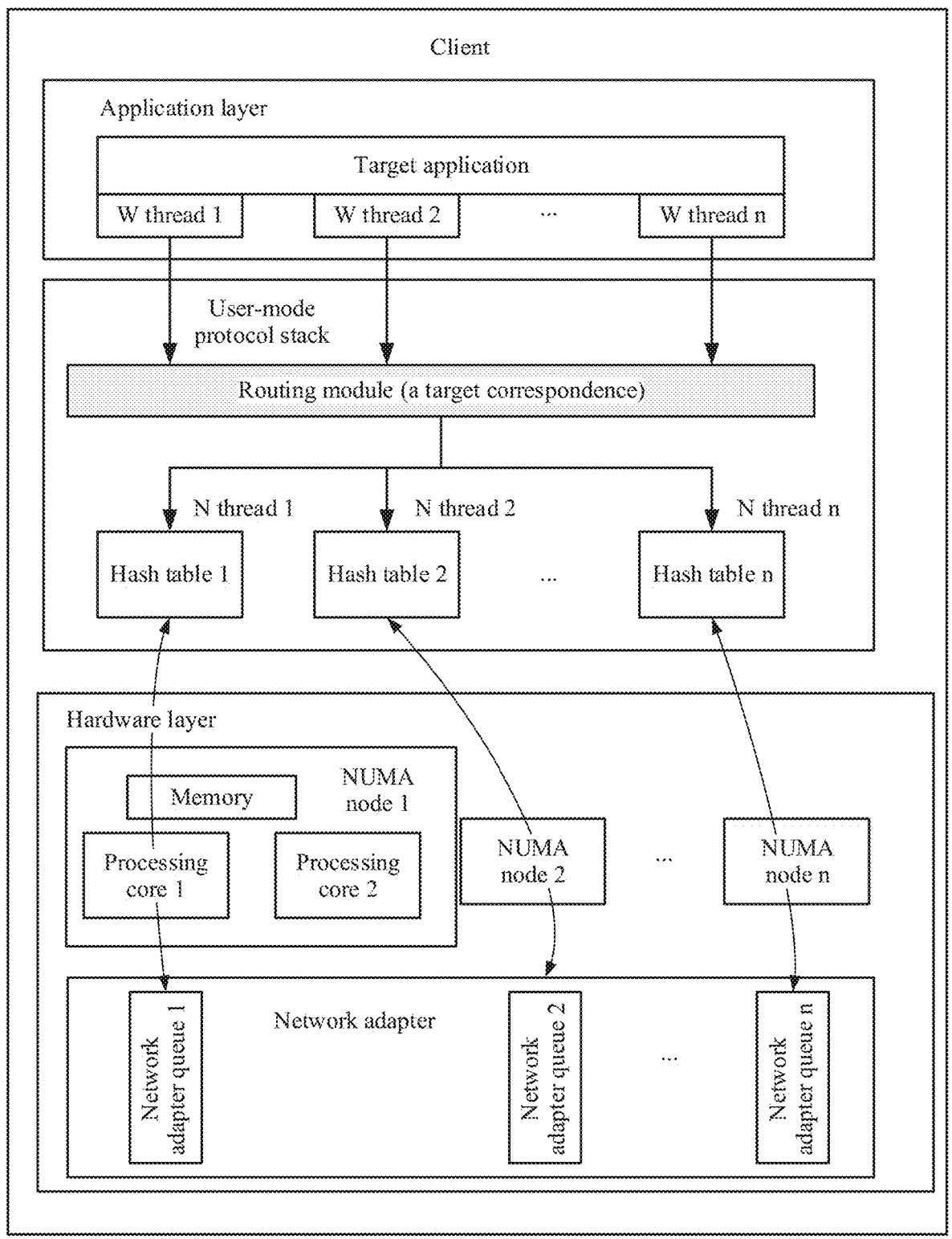
FIG. 4 is a schematic diagram of a structure of a client according to an embodiment of this application.

As shown in FIG. 4, on the client, the routing module in the client maintains a target correspondence. The target correspondence includes a correspondence between a connection file descriptor FD and a target N thread, the target N thread is an N thread selected by the routing module for a first W thread that initiates a connection operation, the first W thread is one of the at least one W thread, and the target N thread is one of the plurality of N threads.

In a communication process, the client obtains the target correspondence, and then communicates with the service side based on the target correspondence.

A process of obtaining the target correspondence may include: receiving, by using the routing module, the connection operation initiated by the first W thread, selecting the target N thread from the plurality of N threads for the connection operation, and generating the connection FD for the first W thread; and establishing the correspondence between the target N thread and the connection FD by using the routing module, to obtain the target correspondence.

The communicating with the service side by using the routing module based on the target correspondence may include: determining, by using the routing module based on the connection FD, a network adapter queue and a NUMA node that corresponds to the target N thread; and sending a link establishment request and first data to the service side by using the network adapter queue and the NUMA node that corresponds to the target N thread.

In addition, after the determining, based on the connection FD, a network adapter queue and a NUMA node that corresponds to the target N thread, the method may further include: allocating a transmit queue to the connection FD in memory of the NUMA node corresponding to the target N thread, where the transmit queue is used to record a memory address of data related to a write operation.

The sending first data to the service side by using the network adapter queue and the NUMA node that corresponds to the target N thread includes: receiving, by using the routing module, a write operation initiated by a second W thread, where the write operation carries the connection FD and the first data, the second thread is one of the plurality of W threads corresponding to the target application, and when the second thread initiates the write operation, the connection FD is transferred by the first W thread to the second W thread; writing, by using the routing module based on the connection FD, the first data into the memory corresponding to the target N thread, and writing a memory address of the first data in the memory into the transmit queue corresponding to the connection FD; and when the target N thread obtains the memory address of the first data in the transmit queue through polling, sending the first data in the memory to the network adapter.

Before the write operation is performed, the method further includes: binding the second W thread to a processing core in the NUMA node on which the target N thread is located.

In this embodiment of this application, in a process in which the client and the service side perform TCP communication, the client may determine, by using the target correspondence (a routing table) in the routing module, a target N thread used in the communication process, to complete the communication process. A binding relationship between the W thread and the N thread does not need to be established in advance, and a plurality of N threads do not need to share one TCP hash table either. This improves universality of the user-mode protocol stack. In addition, because no kernel operation is involved, a context does not need to be switched between the W thread and the N thread, so that performance of the user-mode protocol stack is further improved.

The foregoing describes differences between the service side and the client. The following separately describes a working process of the service side and a working process of the client in a TCP communication connection establishment process and a TCP data processing process with reference to the accompanying drawings.

It should be noted that, for both the service side and the client, N-thread deployment and resource configuration need to be performed before a TCP communication connection is established and data processing is performed. Usually, N-thread deployment is performed based on a quantity of NUMA nodes at the hardware layer. Generally, one N thread is deployed on one NUMA node, and each N thread is bound to one processing core in a corresponding NUMA node. Alternatively, a W thread may be bound to a NUMA node in advance. Certainly, a W thread may alternatively not be bound. If the W thread is not bound, the W thread may be bound according to a load balancing policy or a performance optimization policy in a subsequent communication connection establishment or data processing process. This is not limited in this application.

The following describes the TCP communication connection establishment process and the TCP data processing process of the service side and the client.

Figure 5A:
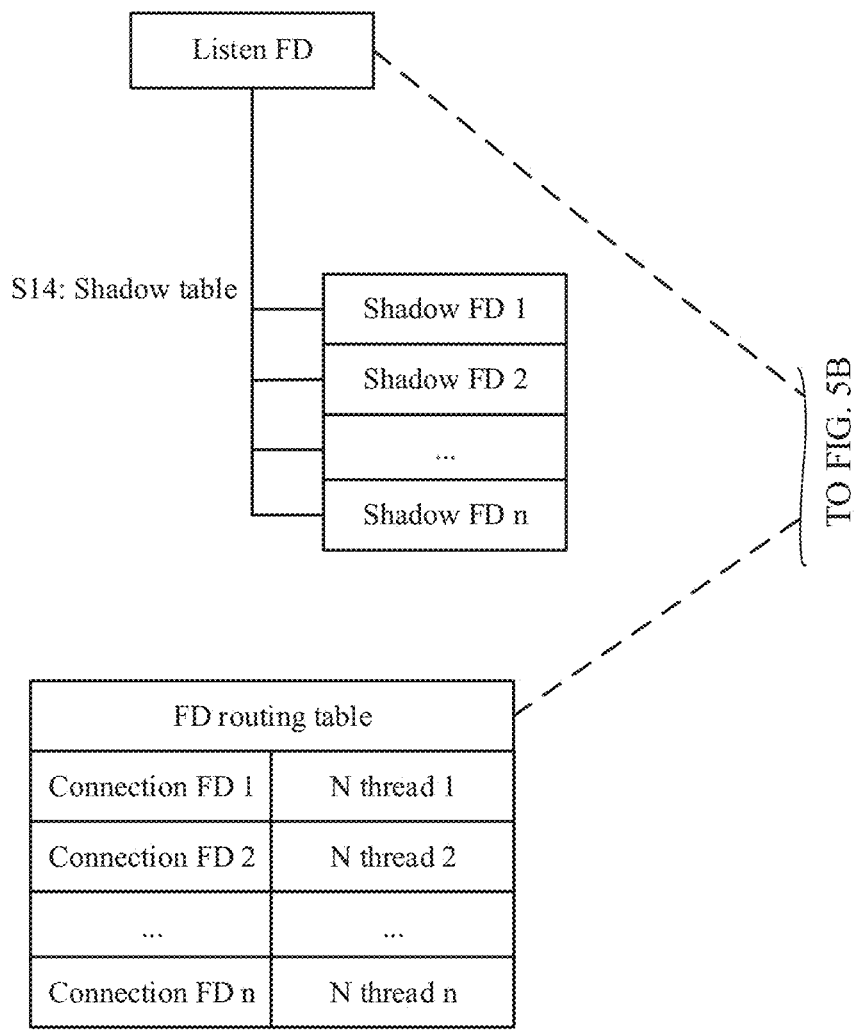
FIG. 5A and FIG. 5B are a schematic diagram of an embodiment of a communication method based on a user-mode protocol stack according to an embodiment of this application.
Figure 5B:
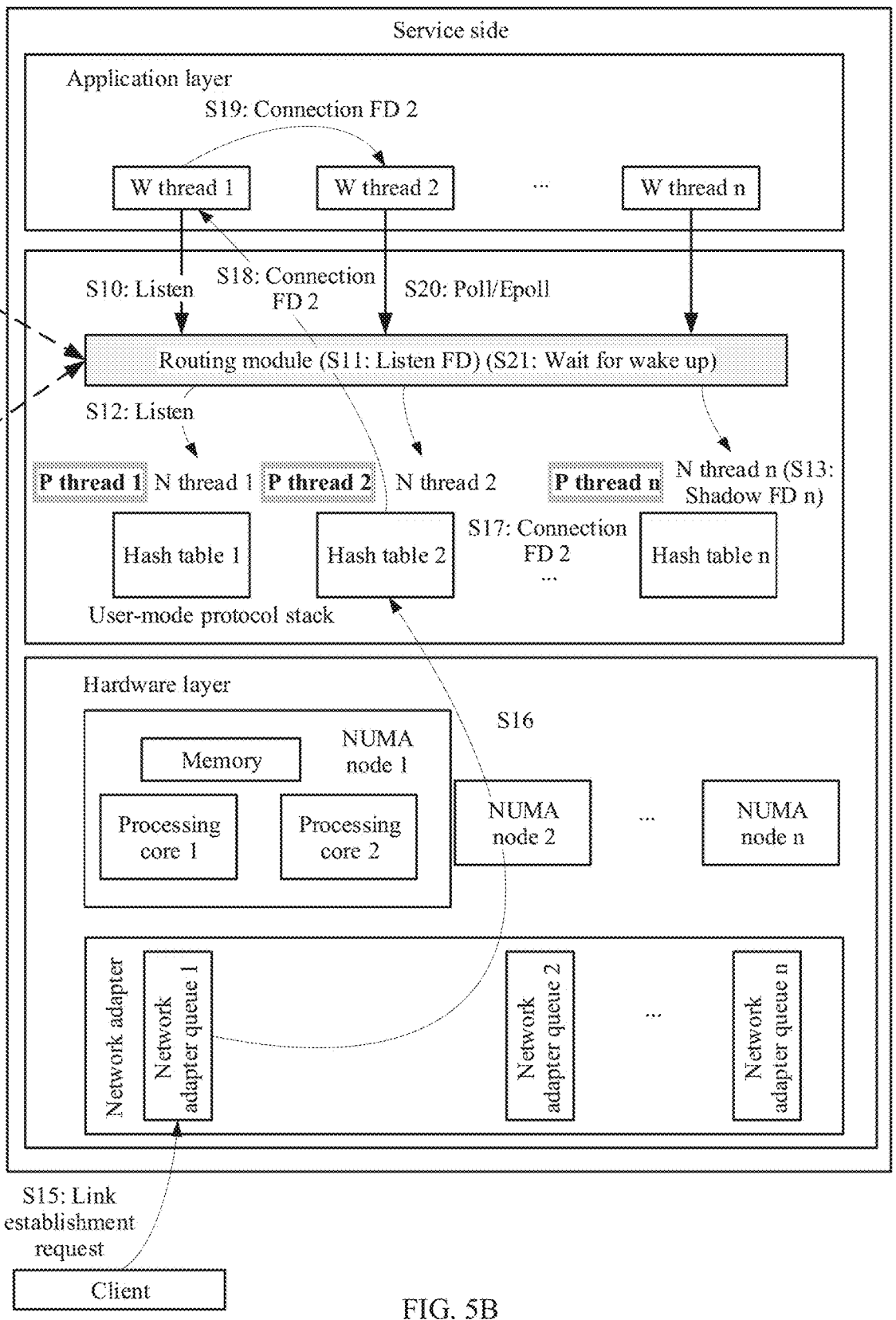

1. Working Process of the Service Side in the TCP Communication Connection Establishment Process As shown in FIG. 5A and FIG. 5B, the working process includes the following steps.

S10: The service side initiates a listen (listen) operation by using a W thread 1.

The W thread 1 may also be referred to as a first W thread.

S11: The routing module receives the listen operation initiated by the W thread 1, and generates a listen FD for the W thread 1.

S12: The routing module initiates a listen operation to each of a plurality of N threads.

In FIG. 5A and FIG. 5B, the plurality of N threads are respectively an N thread 1, an N thread 2, . . . , and an N thread n. Certainly, there may alternatively be two N threads. FIG. 5A and FIG. 5B show merely an example.

S13: Each N thread generates a shadow FD for the corresponding listen operation, and feeds back the shadow FD to the routing module.

S14: The routing module establishes an FD shadow table, that is, a first correspondence, for the listen FD of the W thread 1 and shadow FDs of the n N threads.

The shadow table may be represented in a form shown in the following Table 1.

TABLE 1

| FD shadow table | |
| --- | --- |
| Listen FD | Shadow FD |
| Listen FD of the W1 thread | Shadow FD 1 |
| | Shadow FD 2 |
| | . . . |
| | Shadow FD n |

Certainly, Table 1 shows merely a representation form of the FD shadow table. The representation form of the FD shadow table is not limited in embodiments of this application. Any other form that may indicate a correspondence between a listen FD and a shadow FD may be used as a form of the FD shadow table in this application, for example, a representation form of the FD shadow table shown in FIG. 5A and FIG. 5B.

S15: A network adapter queue 1 in the network adapter receives a link establishment request sent by the client.

The link establishment request may be a TCP SYN packet.

S16: The network adapter selects an N thread 2 as a target N thread based on logic configured for the network adapter.

S17: The N thread 2 establishes a TCP connection, and generates a connection FD (connection FD).

The connection FD in FIG. 5A and FIG. 5B is a connection FD 2.

S18: Return the connection FD 2 to the W thread 1 by using the routing module, and add a correspondence between the connection FD 2 and the N thread 2 to an FD routing table.

A process of returning the connection FD 2 to the W thread 1 by using the routing module may be: determining that a shadow FD corresponding to the N thread 2 is the shadow FD 2, determining, by using the FD shadow table, that the shadow FD 2 corresponds to the listen FD of the W thread 1, and transferring the connection FD 2 to the W thread 1.

For the routing table in this embodiment of this application, refer to Table 2 for understanding.

TABLE 2

| FD routing table | |
| --- | --- |
| Connection FD | N thread |
| Connection FD 1 | N thread 1 |
| Connection FD 2 | N thread 2 |
| . . . | . . . |
| Connection FD n | N thread n |

It should be noted that Table 2 shows merely an example of the FD routing table. The FD routing table may alternatively have another representation form or correspondence. This is not limited in embodiments of this application.

S19: The W thread 1 transfers the connection FD 2 to a W thread 2.

The W thread 2 may be referred to as a second W thread.

FIG. 5A and FIG. 5B show a scenario in which the target application corresponds to a plurality of threads. If the target thread corresponds to a single thread, this step does not need to be performed, and the W thread 1 directly initiates an epoll/poll operation.

S20: The W thread 2 initiates an epoll/poll operation based on the connection FD 2, and then the W2 thread enters a sleep state, where the epoll/poll operation includes the connection FD 2.

S21: After receiving the epoll/poll operation, the routing module determines, based on the connection FD 2 and the FD routing table, that the connection FD 2 corresponds to the N thread 2, and waits for an epoll/poll wake-up event from the N thread 2.

In addition, after it is determined that the connection FD 2 corresponds to the N thread 2, a receive queue and a transmit queue are further allocated to the connection FD 2 in memory of a NUMA 2 node corresponding to the N thread 2.

In this embodiment of this application, for a representation form of a receive queue and a transmit queue that correspond to the connection FD n, refer to Table 3 for understanding.

TABLE 3

Receive queue and transmit queue that correspond to the connection FD n

| Receive queue n (Rx) | Transmit queue n (Tx) |
|---|---|
| Memory address of data | Memory address of data |
| ... | ... |

In this embodiment of this application, each connection FD corresponds to one receive queue and one transmit queue. A value of n in Table 3 may be understood as a variable, and different values correspond to different connection FDs. For example, a table form of the receive queue and the transmit queue of the connection FD 2 may be understood as that n in Table 3 is set to 2.

The receive queue Rx is used to record a memory address of data related to a read operation, and the transmit queue Tx is used to record a memory address of data related to a write operation.

2. Working Process of the Service Side in the TCP Data Processing Process

Figure 6A:
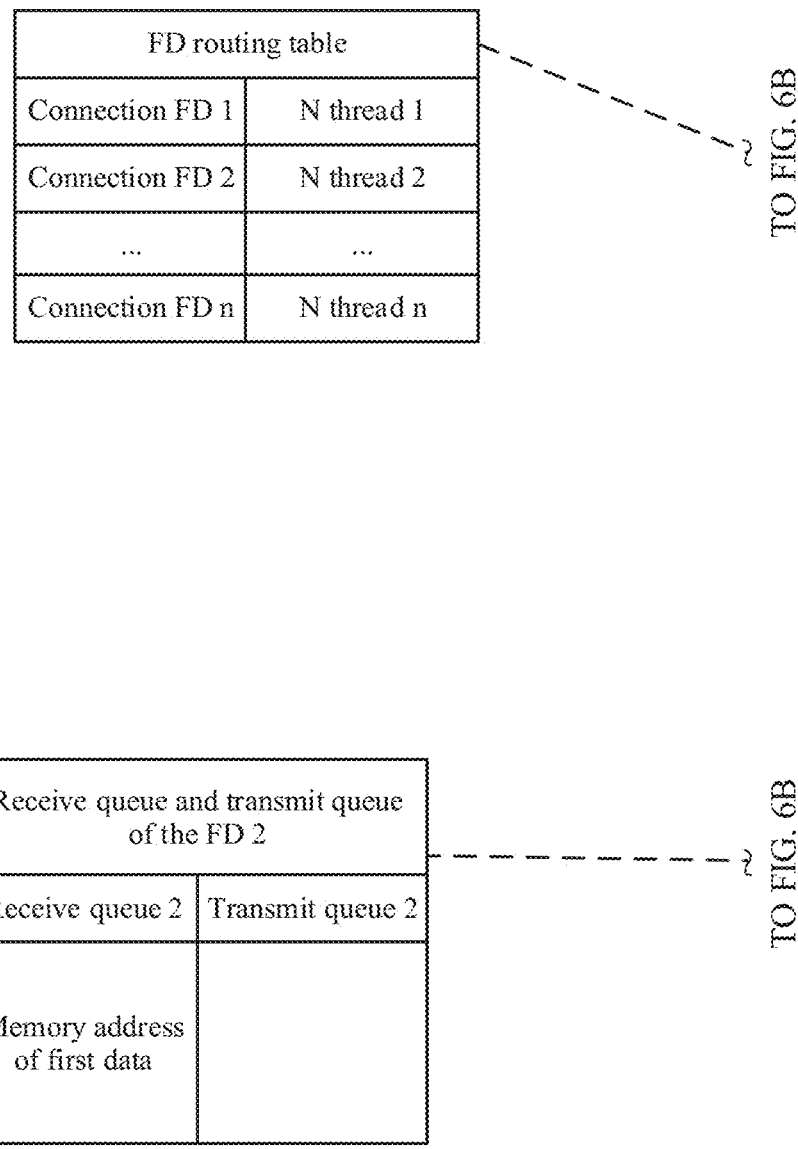
FIG. 6A and FIG. 6B are a schematic diagram of another embodiment of a communication method based on a user-mode protocol stack according to an embodiment of this application.
Figure 6B:
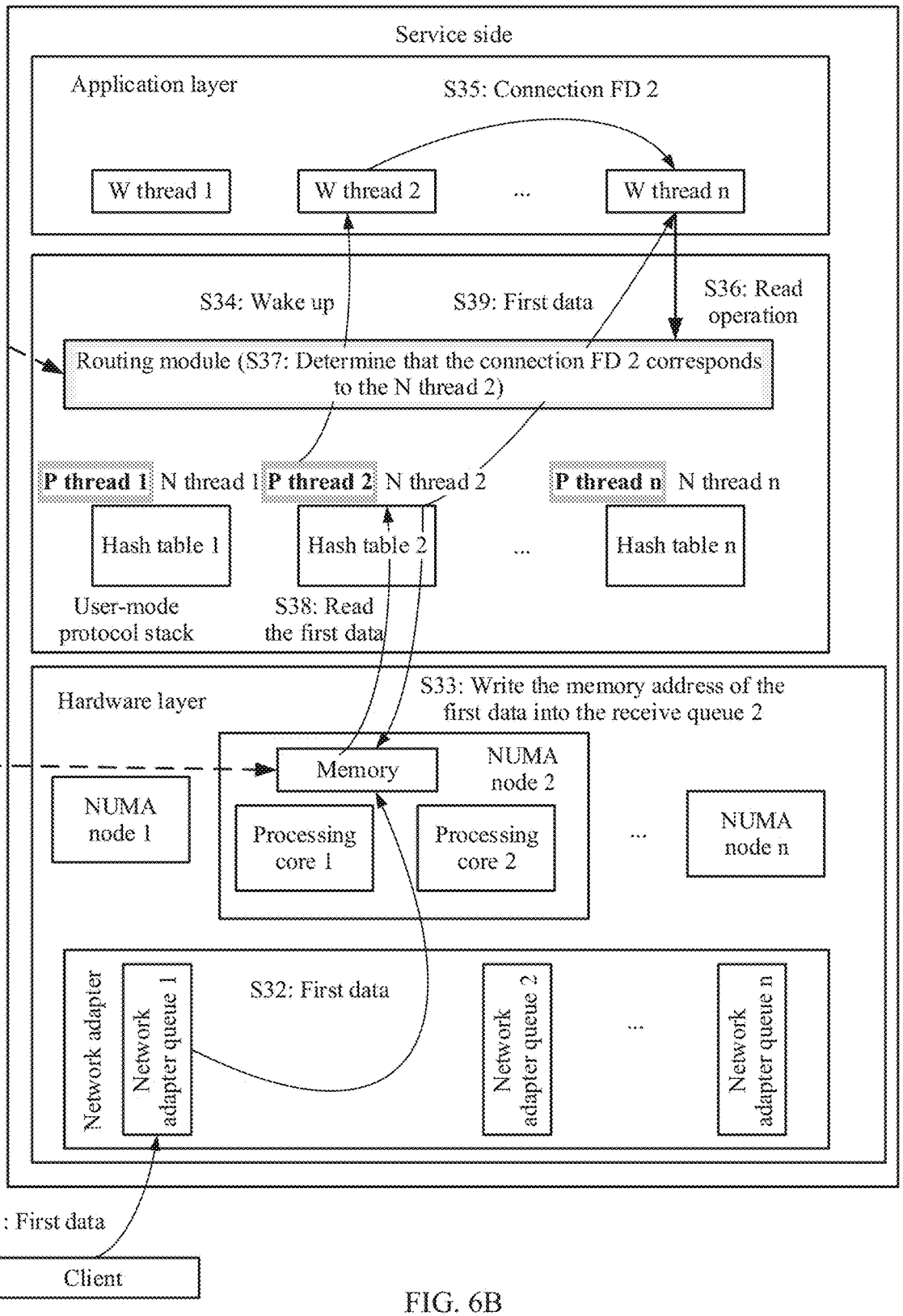

As shown in FIG. 6A and FIG. 6B, the working process includes the following steps.

S31: The network adapter queue 1 in the network adapter receives first data.

The first data may be TCP data.

S32: The network adapter queue 1 in the network adapter writes the first data into the memory of the NUMA node 2 corresponding to the N thread 2.

S33: After obtaining the first data in the memory through polling, the N thread 2 writes a memory address of the first data into the receive queue corresponding to the connection FD 2. Refer to Table 4.

TABLE 4

Receive queue and transmit queue that correspond to the connection FD 2

| Receive queue 2 (Rx) | Transmit queue 2 (Tx) |
|---|---|
| Memory address of the first data | ... |

S34: The N thread 2 wakes up the W thread 2 by using a P thread 2.

The P thread 2 is a wake-up proxy thread of the N thread 2. The W thread 2 is woken up by using the P thread 2, so that the N thread 2 can be prevented from entering a kernel mode. In this way, the N thread 2 can be always in a running (running) state. This can improve network performance and reduce a network delay.

S35: The W thread 2 transfers the connection FD 2 to a W thread n.

The W thread n may be referred to as a third thread.

If the W thread 2 can initiate a read operation, step S35 may not be performed.

S36: If the W thread n initiates a read operation, subsequent steps S37, S38, and S39 are performed.

The read operation includes the connection FD 2.

S37: The routing module takes over the read operation initiated by the W thread n, and determines, based on the connection FD 2 and the FD routing table, that the connection FD 2 corresponds to the N thread 2.

S38: Obtain, in the memory of the NUMA node 2 by using the N thread 2, the memory address of the first data from the receive queue 2 corresponding to the connection FD 2, and read the first data from the memory based on the memory address of the first data.

S39: Copy the first data to a buffer (buffer) corresponding to the W thread n, and process the first data by using the W thread n.

Figure 7B:
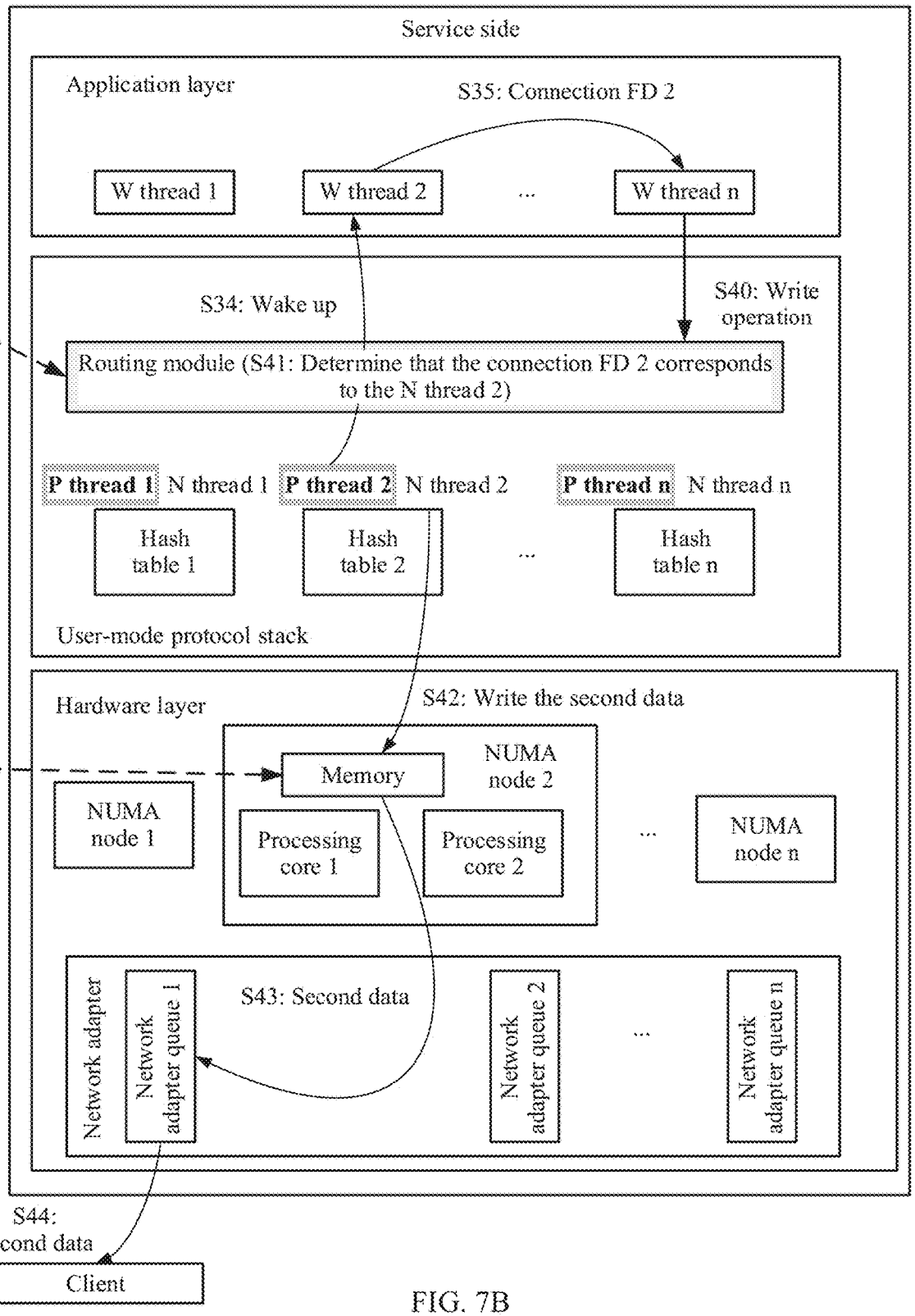

A process of performing a write operation in this embodiment of this application may be understood with reference to FIG. 7A and FIG. 7B. Refer to FIG. 7A and FIG. 7B.

S40: If the W thread n initiates a write operation, subsequent steps S41, S42, S43, and S44 are performed.

The write operation includes the connection FD 2 and second data.

S41: The routing module takes over the write operation initiated by the W thread n, and determines, based on the connection FD 2 and the FD routing table, that the connection FD 2 corresponds to the N thread 2.

S42: Write the second data into the memory of the NUMA node 2 corresponding to the N thread 2, and write a memory address of the second data into the transmit queue corresponding to the FD 2. Refer to Table 5.

TABLE 5

Receive queue and transmit queue that correspond to the connection FD 2

| Receive queue 2 (Rx) | Transmit queue 2 (Tx) |
|---|---|
| ... | Memory address of the second data |

S43: When polling the transmit queue 2, the N thread 2 sends the second data to the network adapter queue 1 based on the memory address of the second data.

S44: The network adapter queue 1 sends the second data to the client.

In addition, in the process of performing the write operation, a wake-up operation and an FD 2 transferring operation also need to be performed. This may be understood with reference to S34 and S35 in FIG. 6A and FIG. 6B.

The communication processes described in FIG. 6A and FIG. 6B and FIG. 7A and FIG. 7B may further include: binding the W thread 2 and the W thread 3 to processing cores of the NUMA node 2. In this way, the W thread 2, and the W thread 3 can share data in the memory with the N thread 2 without a need of crossing NUMA nodes to copy the data. This can improve communication efficiency and reduce a network latency.

Figure 8B:
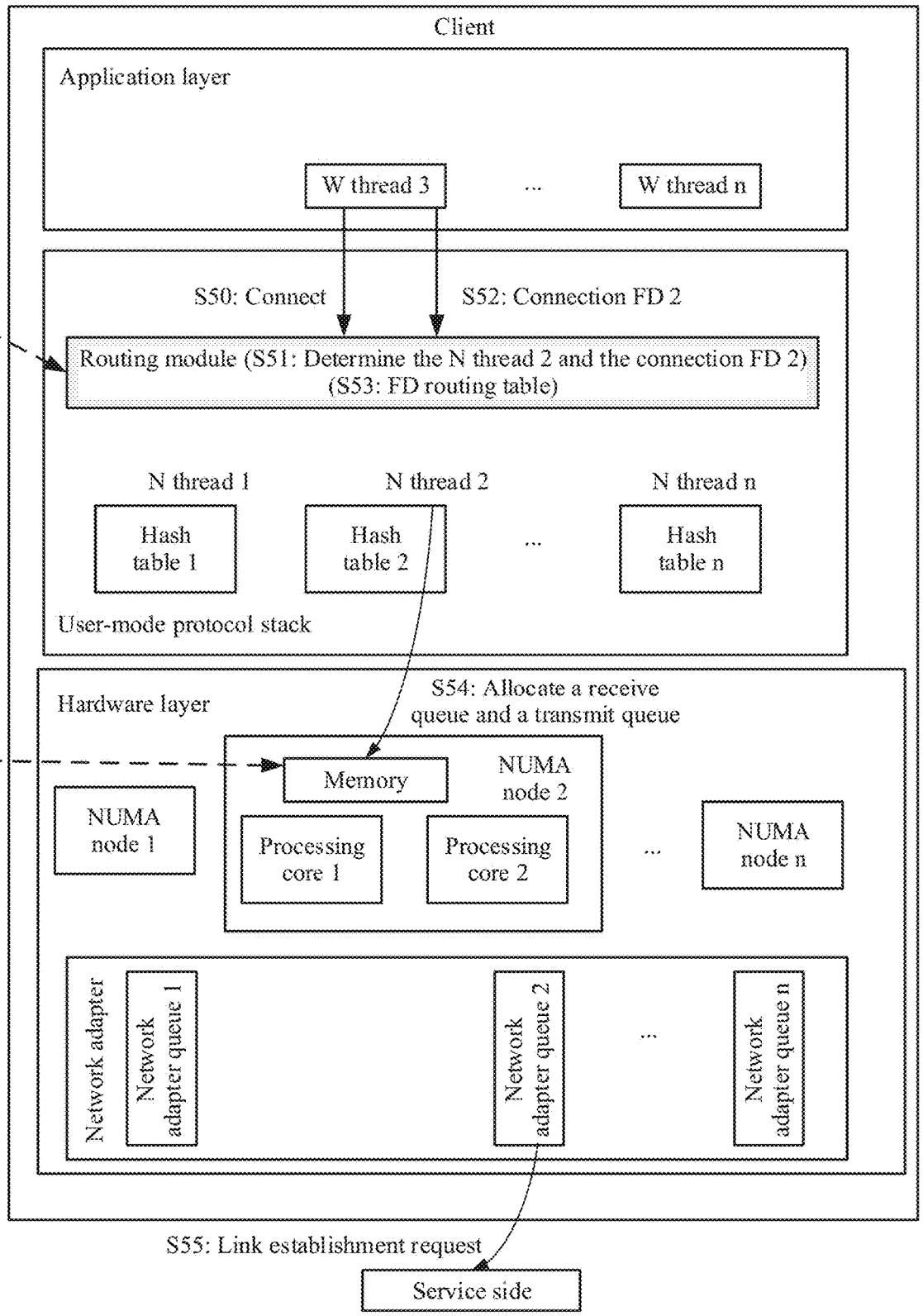

3. Working Process of the Client in the Communication Connection Establishment Process As shown in FIG. 8A and FIG. 8B, the working process includes the following steps.

S50: The client initiates a connection (connection) operation by using a W thread 3.

S51: The routing module receives the connection operation initiated by the W thread 3, selects an N thread 2 from a plurality of N threads as a target N thread for the connection operation of the W thread 3, and generates a connection FD 2 (connection FD) for the W thread 3.

S52: The routing module transfers the connection FD 2 to the W thread 3.

S53: The routing module adds a correspondence between the N thread 2 and the connection FD 2 to an FD routing table.

S54: Allocate a receive queue and a transmit queue to the connection FD 2 in memory of a NUMA node 2 corresponding to the N thread 2.

For this process, refer to the foregoing related content of the service side for understanding. Details are not described herein again.

S55: Send a link establishment request to the service side by using a network adapter queue 2 and the NUMA node 2 that corresponds to the N thread 2.

4. Working Process of the Client in the TCP Data Processing Process

Figure 9B:
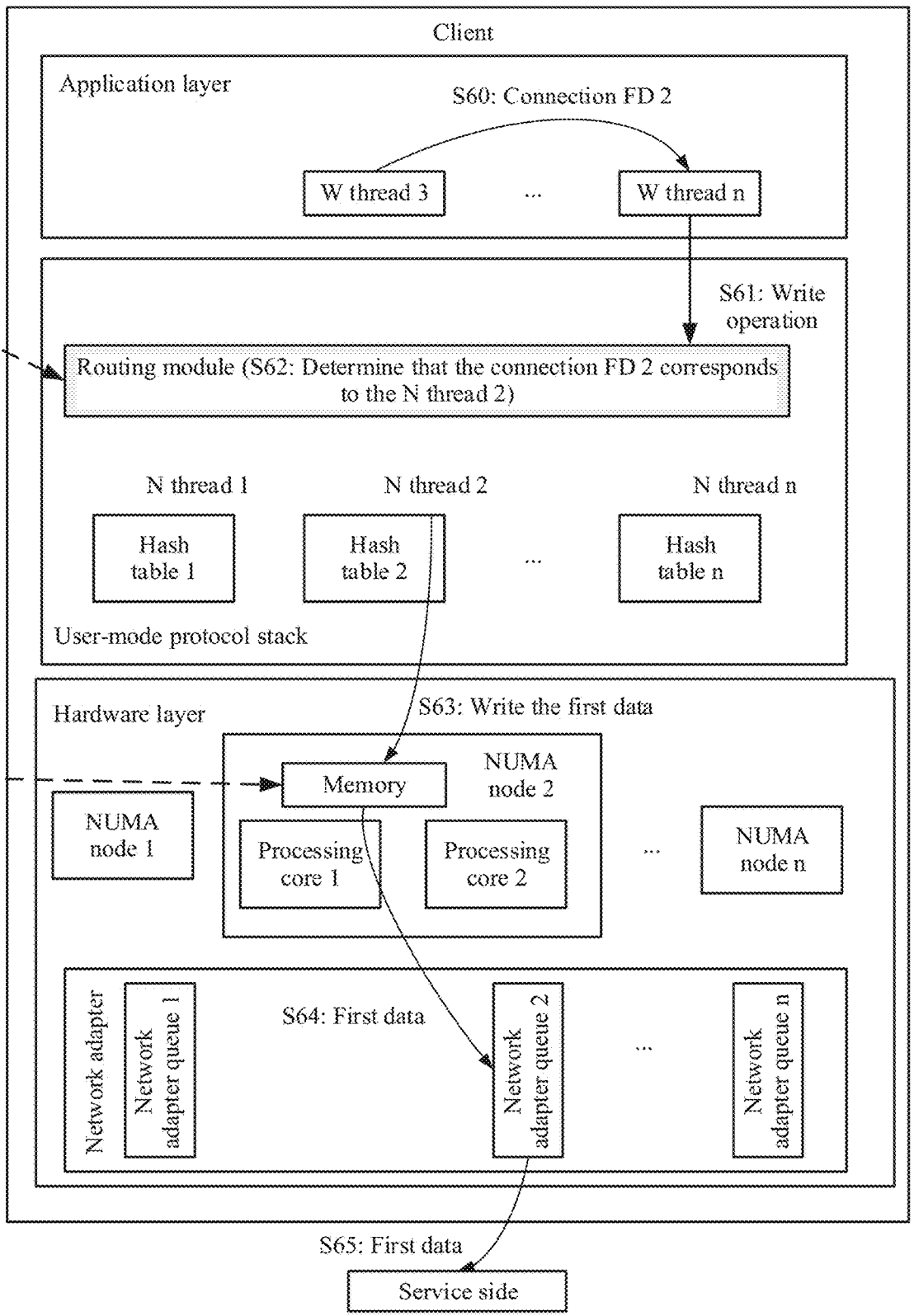

As shown in FIG. 9A and FIG. 9B, a write operation process includes the following steps.

S60: The W thread 3 transfers the connection FD 2 to a W thread n.

A write operation includes the connection FD 2 and first data.

S61: The W thread 3 initiates the write operation.

The write operation includes the connection FD 2 and the first data.

S62: The routing module takes over the write operation initiated by the W thread n, and determines, based on the connection FD 2 and the FD routing table, that the connection FD 2 corresponds to the N thread 2.

S63: Write the first data into the memory of the NUMA node 2 corresponding to the N thread 2, and write a memory address of the second data into the transmit queue corresponding to the FD 2. Refer to Table 5 for understanding.

S64: When polling a transmit queue 2, the N thread 2 sends the first data to the network adapter queue 2 based on the memory address of the first data.

S65: The network adapter queue 2 sends the second data to the client.

For a read operation process of the client, refer to the foregoing read operation process of the service side for understanding, but a wake-up operation does not need to be performed, and the first data is replaced with the second data.

To verify performance of the user-mode protocol stack provided in embodiments of this application in a communication process, the engineering developer repeatedly performs experiments on processing a MySQL request by using the solution in this application and processing a MySQL request by using the solution in the conventional technology. An experiment result shows that when the MySQL request is processed by using the solution in this application, linearity of less than 160 TCP connections can be kept close to 1, and relatively good performance can still be maintained when a quantity of connections exceeds 240. However, when the MySQL request is processed by using the solution in the conventional technology, and a quantity of TCP connections reaches 40, severe multi-thread memory access contention occurs, and performance rapidly deteriorates. It can be learned from a comparison between an effect of the solution in this application and an effect of the solution in the conventional technology that, the solution in this application can effectively reduce multi-thread memory access contention, and improve performance of a computer device in the communication process.

The foregoing describes the communication method based on a user-mode protocol stack. The following describes, with reference to the accompanying drawings, a service side and a client provided in embodiments of this application.

Figure 10:
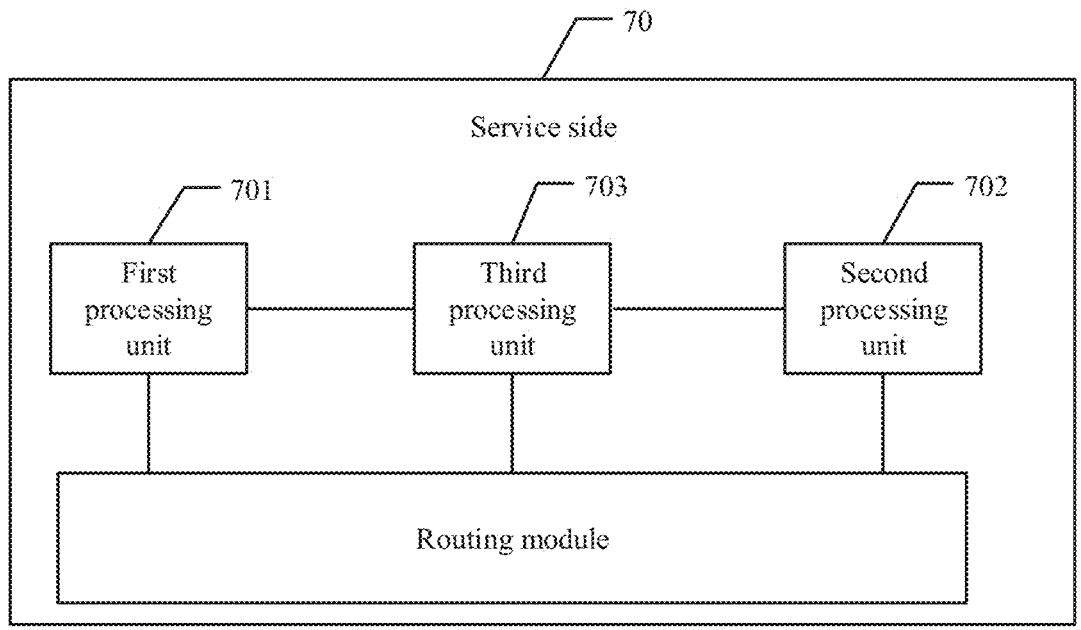
FIG. 10 is a schematic diagram of a structure of a service side according to an embodiment of this application.

As shown in FIG. 10, in an embodiment of a service side 70 provided in an embodiment of this application, the service side includes an application layer, a user-mode protocol stack, and a hardware layer. A target application of the application layer corresponds to at least one W thread, and the W thread is a thread for processing data of the target application. The user-mode protocol stack includes a plurality of N threads, a routing module, and transmission control protocol hash tables that are in a one-to-one correspondence with the plurality of N threads. The N thread is a user-mode protocol stack thread. The hardware layer includes a plurality of non-uniform memory access NUMA nodes and a network adapter. The plurality of N threads are in a one-to-one correspondence with the plurality of NUMA nodes. The service side further includes:

a first processing unit 701, configured to obtain a first correspondence by using the routing module, where the first correspondence includes a correspondence between a listen file descriptor FD of a first W thread and a plurality of shadow FDs, the plurality of shadow FDs are generated in a one-to-one manner for the plurality of N threads, and the first W thread is one of the at least one W thread;

a second processing unit 702, configured to obtain a second correspondence by using the routing module, where the second correspondence includes a correspondence between a target N thread and a connection FD, and the target N thread is an N thread selected by the network adapter from the plurality of N threads when a communication connection to a client is established; and a third processing unit 703, configured to communicate, by using the routing module, with the client based on the first correspondence obtained by the first processing unit 701 and the second correspondence obtained by the second processing unit 702.

In this application, in a process in which the client and the service side perform TCP communication, the service side may implement, by using the first correspondence (that is, a shadow table) in the routing module, corresponding association search from an N thread to a W thread, to transfer a connection FD; and then, may determine by using the routing module and the second correspondence (a routing table), a target N thread used in the communication process, to complete the communication process. It can be learned from the foregoing solution that, in this application, a binding relationship between the W thread and the N thread does not need to be established in advance, and a plurality of N threads do not need to share one TCP hash table either. This can decouple the W thread from the N thread, and improve universality of the user-mode protocol stack. In addition, because no kernel operation is involved, a context does not need to be switched between the W thread and the N thread, so that performance of the user-mode protocol stack is further improved.

Optionally, the first processing unit 701 is configured to: receive, by using the routing module, a listen operation initiated by the first W thread, and generate the listen FD for the first W thread; initiate a listen operation to each of the plurality of N threads by using the routing module, to obtain a plurality of shadow FDs corresponding to the plurality of N threads, where the plurality of shadow FDs are in a one-to-one correspondence with the plurality of N threads; and establish a correspondence between the listen FD and the plurality of shadow FDs by using the routing module, to obtain the first correspondence.

Optionally, the network adapter includes at least one network adapter queue. The second processing unit 702 is configured to: obtain, by using the routing module, the connection FD generated by the target N thread to establish the communication connection, where the communication connection is established based on a link establishment request that is sent by the client and that is received by a first network adapter queue, and the first network adapter queue is one of the at least one network adapter queue; and establish the correspondence between the target N thread and the connection FD by using the routing module, to obtain the second correspondence.

Optionally, the third processing unit 703 is configured to: transfer, by using the routing module, the connection FD corresponding to the target N thread to the first W thread based on a correspondence that is in the first correspondence and that is between a shadow FD corresponding to the target N thread and the listen FD corresponding to the first W thread; and communicate with the client by using the routing module based on the connection FD and the second correspondence.

Optionally, when there are a plurality of W threads corresponding to the target application, the third processing unit 703 is configured to: receive, by using the routing module, a poll_wait/extended epoll_wait event initiated by a second W thread, where the poll/epoll event includes the connection FD, the connection FD is transferred by the first W thread to the second W thread, the second W thread enters a sleep state after initiating the poll/epoll event, and the second W thread is one of the plurality of W threads corresponding to the target application; determine, by using the routing module based on the second correspondence, that the connection FD corresponds to the target N thread, to wait for a wake-up event related to the target thread; and after the second W thread is woken up, perform, by using the routing module based on the second correspondence, a read operation or a write operation related to the target N thread.

Optionally, the third processing unit 703 is further configured to wake up the second W thread by using a wake-up proxy thread associated with the target N thread.

Optionally, the third processing unit 703 is further configured to allocate a receive queue and a transmit queue to the connection FD in memory of a NUMA node corresponding to the target N thread, where the receive queue is used to record a memory address of data related to the read operation, and the transmit queue is used to record a memory address of data related to the write operation.

Optionally, the third processing unit 703 is configured to: receive, by using the routing module, a read operation initiated by the second W thread or a third W thread, where the read operation carries the connection FD, the third thread is one of the plurality of W threads corresponding to the target application, and when the third thread initiates the read operation, the connection FD is transferred by the second W thread to the third W thread; obtain, by using the routing module based on the connection FD, a memory address of first data from the receive queue associated with the connection FD, where the first data is data received from the client by the first network adapter queue associated with the target N thread, and the first network adapter queue is a network adapter queue that receives the link establishment request sent by the client; and obtain the first data based on the memory address of the first data, and transfer the first data to the second thread or the third W thread for processing.

Optionally, the third processing unit 703 is configured to: receive, by using the routing module, a write operation initiated by the second W thread or a third W thread, where the write operation carries the connection FD and second data, the third thread is one of the plurality of W threads corresponding to the target application, and when the third thread initiates the write operation, the connection FD is transferred by the second W thread to the third W thread; write, by using the routing module based on the connection FD, the second data into the memory corresponding to the target N thread, and write a memory address of the second data in the memory into the transmit queue corresponding to the connection FD; and when the target N thread obtains the memory address of the second data in the transmit queue through polling, send the second data in the memory to the network adapter.

Optionally, the third processing unit 703 is further configured to bind the second W thread or the third W thread to a processing core in the NUMA node on which the target N thread is located.

Optionally, the memory in the NUMA node corresponding to the target N thread is huge page memory.

Figure 11:
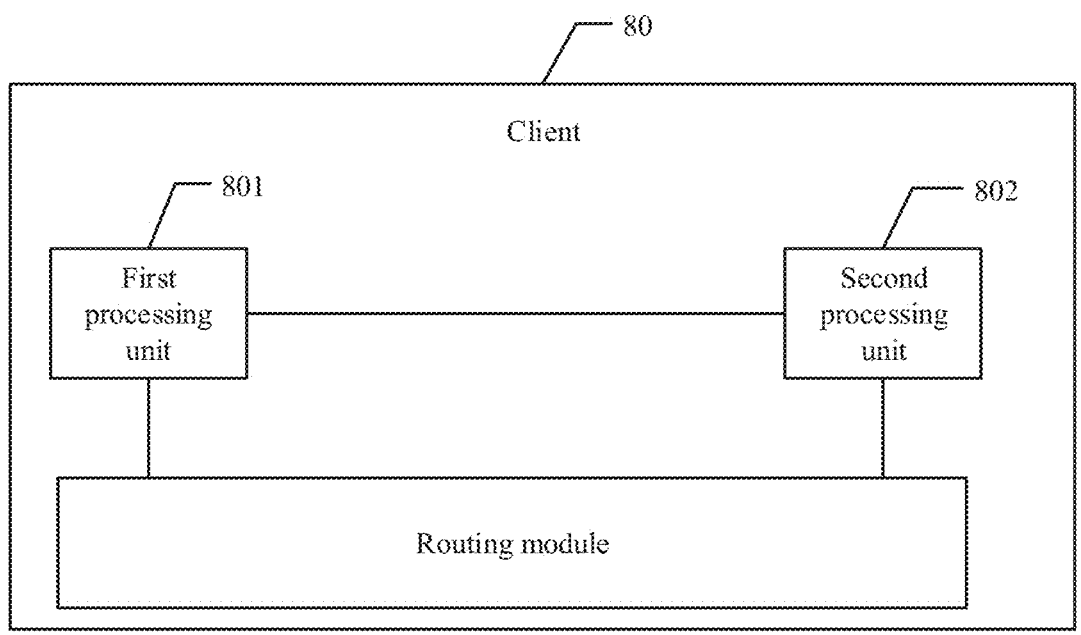
FIG. 11 is a schematic diagram of a structure of a client according to an embodiment of this application.

As shown in FIG. 11, in an embodiment of a client 80 provided in an embodiment of this application, the client 80 includes an application layer, a user-mode protocol stack, and a hardware layer. A target application of the application layer corresponds to at least one W thread, and the W thread is a thread for processing data of the target application. The user-mode protocol stack includes a plurality of N threads, a routing module, and transmission control protocol hash tables that are in a one-to-one correspondence with the plurality of N threads. The N thread is a user-mode protocol stack thread. The hardware layer includes a plurality of non-uniform memory access NUMA nodes. The plurality of N threads are in a one-to-one correspondence with the plurality of NUMA nodes. The client 80 further includes:

a first processing unit 801, configured to obtain a target correspondence by using the routing module, where the target correspondence includes a correspondence between a connection file descriptor FD and a target N thread, the target N thread is an N thread selected by the routing module for a first W thread that initiates a connection operation, the first W thread is one of the at least one W thread, and the target N thread is one of the plurality of N threads; and a second processing unit 802, configured to communicate with a service side by using the routing module based on the target correspondence.

In this embodiment of this application, in a process in which the client and the service side perform TCP communication, the client may determine, by using the target correspondence (a routing table) in the routing module, a target N thread used in the communication process, to complete the communication process. A binding relationship between the W thread and the N thread does not need to be established in advance, and a plurality of N threads do not need to share one TCP hash table either. This improves universality of the user-mode protocol stack. In addition, because no kernel operation is involved, a context does not need to be switched between the W thread and the N thread, so that performance of the user-mode protocol stack is further improved.

Optionally, the first processing unit 801 is configured to: receive, by using the routing module, the connection operation initiated by the first W thread, select the target N thread from the plurality of N threads for the connection operation, and generate the connection FD for the first W thread; and establish the correspondence between the target N thread and the connection FD by using the routing module, to obtain the target correspondence.

Optionally, the second processing unit 802 is configured to: determine, by using the routing module based on the connection FD, a network adapter queue and a NUMA node that corresponds to the target N thread; and send a link establishment request and first data to the service side by using the network adapter queue and the NUMA node that corresponds to the target N thread.

Optionally, the second processing unit 802 is further configured to allocate a transmit queue to the connection FD in memory of the NUMA node corresponding to the target N thread, where the transmit queue is used to record a memory address of data related to a write operation.

Optionally, the second processing unit 802 is configured to: receive, by using the routing module, a write operation initiated by a second W thread, where the write operation carries the connection FD and the first data, the second thread is one of the plurality of W threads corresponding to the target application, and when the second thread initiates the write operation, the connection FD is transferred by the first W thread to the second W thread; write, by using the routing module based on the connection FD, the first data into the memory corresponding to the target N thread, and write a memory address of the first data in the memory into the transmit queue corresponding to the connection FD; and when the target N thread obtains the memory address of the first data in the transmit queue through polling, send the first data in the memory to a network adapter.

Optionally, the second processing unit 802 is further configured to: before the write operation is performed, bind the second W thread to a processing core in the NUMA node on which the target N thread is located.

For the service side 70 and the client 80 described above, refer to corresponding content in the foregoing method embodiments for understanding. Details are not described herein again.

Figure 12:
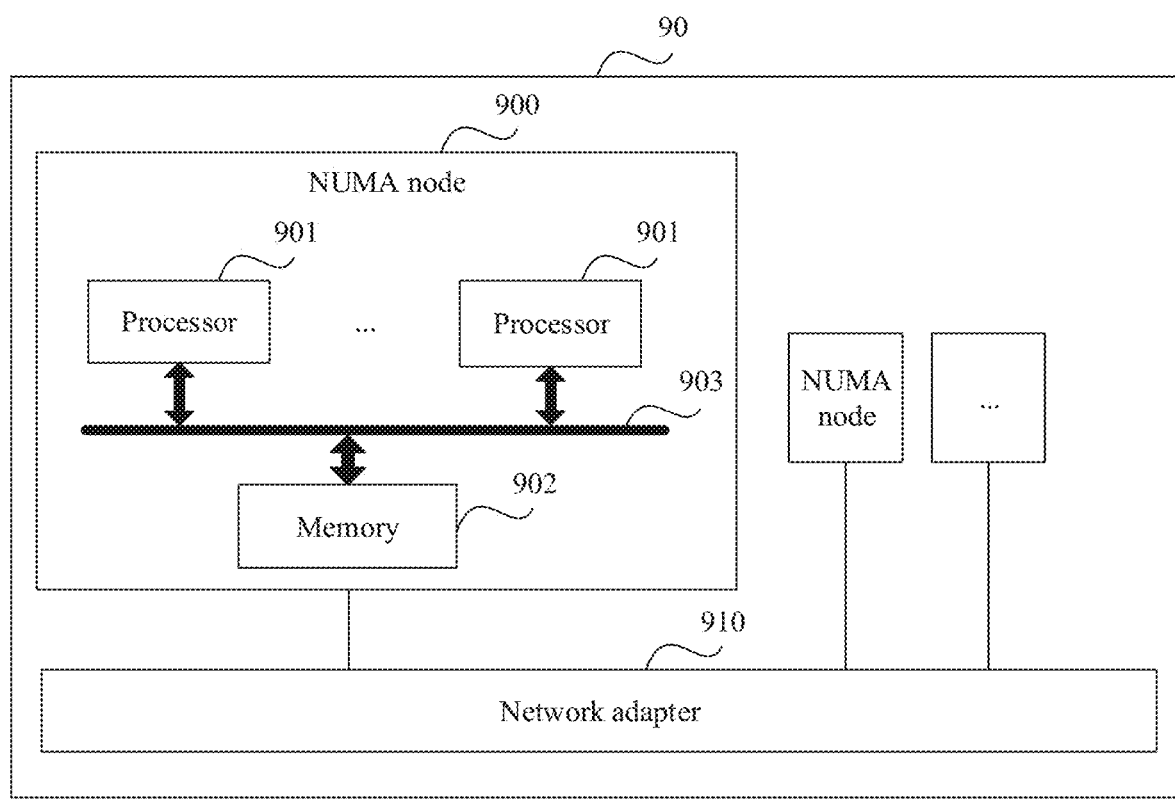
FIG. 12 is a schematic diagram of a structure of a computer device according to an embodiment of this application.

FIG. 12 is a schematic diagram of a possible logical structure of a computer device 90 according to an embodiment of this application. The computer device 90 includes a plurality of NUMA nodes 900 and a network adapter 910, and each NUMA node includes a plurality of processors 901, a memory 902, and a bus 903. The processor 901 and the memory 902 are connected to each other through the bus 903. In this embodiment of this application, the processor 901 is configured to control and manage an action of the computer device 90. For example, the processor 901 is configured to perform the steps in FIG. 5A and FIG. 5B to FIG. 9A and FIG. 9B. The bus 903 is configured to support the computer device 90 in performing communication. The memory 902 is configured to: store program code and data of the computer device 90, and provide memory space for a process group. The network adapter is configured to communicate with another device.

The processor 901 may be a central processing unit, a general-purpose processor, a digital signal processor, an application-specific integrated circuit, a field programmable gate array or another programmable logic device, a transistor logic device, a hardware component, or any combination thereof. The processor may implement or execute various example logical blocks, modules, and circuits described with reference to content disclosed in this application. Alternatively, the processor 901 may be a combination implementing a computing function, for example, a combination of one or more microprocessors or a combination of a digital signal processor and a microprocessor. The bus 903 may be a peripheral component interconnect (PCI) bus, an extended industry standard architecture (EISA) bus, or the like. The bus may be classified into an address bus, a data bus, a control bus, or the like. For ease of representation, only one bold line is used to represent the bus in FIG. 12, but this does not mean that there is only one bus or only one type of bus.

In another embodiment of this application, a computer-readable storage medium is further provided. The computer-readable storage medium stores computer-executable instructions. When a processor of a device executes the computer-executable instructions, the device performs the steps in FIG. 5A and FIG. 5B to FIG. 9A and FIG. 9B.

In another embodiment of this application, a computer program product is further provided. The computer program product includes computer-executable instructions, and the computer-executable instructions are stored in a computer-readable storage medium. When a processor of a device executes the computer-executable instructions, the device performs the steps in FIG. 5A and FIG. 5B to FIG. 9A and FIG. 9B.

In another embodiment of this application, a chip system is further provided. The chip system includes a processor, and the processor is configured to support a memory management apparatus in implementing the steps in FIG. 5A and FIG. 5B to FIG. 9A and FIG. 9B. In a possible design, the chip system may further include a memory. The memory is configured to store necessary program instructions and data of a service side or a client. The chip system may include a chip, or may include a chip and another discrete device.

A person of ordinary skill in the art may be aware that, in combination with the examples described in embodiments disclosed in this specification, units and algorithm steps can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of embodiments of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In several embodiments provided in embodiments of this application, it should be understood that the disclosed system, apparatus, and method may be implemented in another manner. For example, the foregoing described apparatus embodiments are merely examples. For example, division into the units is merely logical function division. During actual implementation, there may be another division manner. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

Units described as separate parts may or may not be physically separate. Parts displayed as units may or may not be physical units, in other words, may be located in one location, or may be distributed on a plurality of network units. A part or all of the units may be selected based on actual requirements to achieve the objectives of the solutions of embodiments.

In addition, functional units in embodiments of this application may be integrated into one processing unit, or each of the units may exist alone physically, or two or more units are integrated into one unit.

When functions are implemented in a form of a software functional unit and sold or used as an independent product, the functions may be stored in a computer-readable storage medium. Based on such an understanding, the technical solutions of embodiments of this application essentially, or the part contributing to the conventional technology, or a part of the technical solutions may be implemented in a form of a software product. The computer software product is stored in a storage medium, and includes several instructions for instructing a computer device (which may be a personal computer, a server, a network device, or the like) to perform all or a part of the steps of the methods in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of embodiments of this application, but are not intended to limit the protection scope of embodiments of this application.

What is claimed is:

1. A communication method based on a user-mode protocol stack and applied to a service side, wherein the service side comprises an application layer, the user-mode protocol stack, and a hardware layer, wherein a target application of the application layer corresponds to at least one W thread, each of the at least one W thread is a thread for processing data of the target application, wherein the user-mode protocol stack comprises a plurality of N threads, a routing module, and transmission control protocol hash tables that are in a one-to-one correspondence with the plurality of N threads, wherein each of the plurality of N threads is a user-mode protocol stack thread, wherein the hardware layer comprises a plurality of non-uniform memory access (NUMA) nodes and a network adapter, and wherein the plurality of N threads are in a one-to-one correspondence with the plurality of NUMA nodes, and the method comprises:

obtaining a first correspondence by using the routing module, wherein the first correspondence comprises a correspondence between a listen file descriptor (FD) of a first W thread and a plurality of shadow FDs, the plurality of shadow FDs are generated in a one-to-one manner for the plurality of N threads, and the first W thread is one of the at least one W thread;

obtaining a second correspondence by using the routing module, wherein the second correspondence comprises a correspondence between a target N thread and a connection FD, and the target N thread is an N thread selected by the network adapter from the plurality of N threads when a communication connection to a client is established; and communicating with the client by using the routing module based on the first correspondence and the second correspondence, wherein the communicating with the client by using the routing module based on the first correspondence and the second correspondence comprises:

transferring, by using the routing module, the connection FD corresponding to the target N thread to the first W thread based on a correspondence that is in the first correspondence and that is between a shadow FD corresponding to the target N thread and the listen FD corresponding to the first W thread; and communicating with the client by using the routing module based on the connection FD and the second correspondence.

2. The communication method according to claim 1, wherein the obtaining a first correspondence by using the routing module comprises:

receiving, by using the routing module, a listen operation initiated by the first W thread;

generating the listen FD for the first W thread;

initiating a listen operation to each of the plurality of N threads by using the routing module, to obtain the plurality of shadow FDs corresponding to the plurality of N threads, wherein the plurality of shadow FDs are in a one-to-one correspondence with the plurality of N threads; and establishing the correspondence between the listen FD and the plurality of shadow FDs by using the routing module, to obtain the first correspondence.

3. The communication method according to claim 1, wherein the network adapter comprises at least one network adapter queue, and the obtaining a second correspondence by using the routing module comprises:

obtaining, by using the routing module, the connection FD generated by the target N thread to establish the communication connection, wherein the communication connection is established based on a link establishment request that is sent by the client and that is received by a first network adapter queue, and the first network adapter queue is one of the at least one network adapter queue; and establishing the correspondence between the target N thread and the connection FD by using the routing module, to obtain the second correspondence.

4. The communication method according to claim 1, wherein when there are a plurality of W threads corresponding to the target application, the communicating with the client by using the routing module based on the connection FD and the second correspondence comprises:

receiving, by using the routing module, a poll/extended poll (epoll) event initiated by a second W thread, wherein the poll/epoll event comprises the connection FD, the connection FD is transferred by the first W thread to the second W thread, the second W thread enters a sleep state after initiating the poll/epoll event, and the second W thread is one of the plurality of W threads corresponding to the target application;

determining, by using the routing module based on the second correspondence, that the connection FD corresponds to the target N thread, to wait for a wake-up event related to the target N thread; and after the second W thread is woken up, performing, by using the routing module based on the second correspondence, a read operation or a write operation related to the target N thread.

5. The communication method according to claim 4, wherein the method further comprises:

waking up the second W thread by using a wake-up proxy thread associated with the target N thread.

6. The communication method according to claim 4, wherein after the determining, by using the routing module based on the second correspondence, that the connection FD corresponds to the target N thread, the method further comprises:

allocating a receive queue and a transmit queue to the connection FD in a memory of a NUMA node corresponding to the target N thread, wherein the receive queue is used to record a memory address of data related to the read operation, and the transmit queue is used to record a memory address of data related to the write operation.

7. The communication method according to claim 6, wherein the performing, by using the routing module based on the second correspondence, a read operation related to the target N thread comprises:

receiving, by using the routing module, a read operation initiated by the second W thread or a third W thread, wherein the received read operation carries the connection FD, the third W thread is one of the plurality of W threads corresponding to the target application, and when the third W thread initiates the received read operation, the connection FD is transferred by the second W thread to the third W thread;

obtaining, by using the routing module based on the connection FD, a memory address of first data from the receive queue associated with the connection FD, wherein the first data is data received from the client by a first network adapter queue associated with the target N thread, and the first network adapter queue is a network adapter queue that receives a link establishment request sent by the client;

obtaining the first data based on the memory address of the first data; and transferring the first data to the second W thread or the third W thread for processing.

8. The communication method according to claim 6, wherein the performing, by using the routing module based on the second correspondence, a write operation related to the target N thread comprises:

receiving, by using the routing module, a write operation initiated by the second W thread or a third W thread, wherein the received write operation carries the connection FD and second data, the third W thread is one of the plurality of W threads corresponding to the target application, and when the third W thread initiates the received write operation, the connection FD is transferred by the second W thread to the third W thread;

writing, by using the routing module based on the connection FD, the second data into the memory corresponding to the target N thread;

writing a memory address of the second data in the memory into the transmit queue corresponding to the connection FD; and when the target N thread obtains the memory address of the second data in the transmit queue through polling, sending the second data in the memory to the network adapter.

9. The communication method according to claim 7, wherein before the performing a read operation or a write operation, the method further comprises:

binding the second W thread or the third W thread to a processing core in the NUMA node on which the target N thread is located.

10. A communication method based on a user-mode protocol stack and applied to a client, wherein the client comprises an application layer, the user-mode protocol stack, and a hardware layer, wherein a target application of the application layer corresponds to at least one W thread, each of the at least one W thread is a thread for processing data of the target application, wherein the user-mode protocol stack comprises a plurality of N threads, a routing module, and transmission control protocol hash tables that are in a one-to-one correspondence with the plurality of N threads, wherein each of the plurality of N threads is a user-mode protocol stack thread, wherein the hardware layer comprises a plurality of non-uniform memory access (NUMA) nodes, and wherein the plurality of N threads are in a one-to-one correspondence with the plurality of NUMA nodes, and the method comprises:

obtaining a target correspondence by using the routing module, wherein the target correspondence comprises a correspondence between a connection file descriptor (FD) and a target N thread, the target N thread is an N thread selected by the routing module for a first W thread that initiates a connection operation, the first W thread is one of the at least one W thread, and the target N thread is one of the plurality of N threads; and communicating with a service side by using the routing module based on the target correspondence, wherein the communicating with the service side by using the routing module based on the target correspondence comprises:

determining, by using the routing module based on the connection FD, a network adapter queue and a NUMA node that corresponds to the target N thread; and sending a link establishment request and first data to the service side by using the network adapter queue and the NUMA node that corresponds to the target N thread.

11. The communication method according to claim 10, wherein the obtaining a target correspondence by using the routing module comprises:

receiving, by using the routing module, the connection operation initiated by the first W thread;

selecting the target N thread from the plurality of N threads for the connection operation, generating the connection FD for the first W thread; and establishing the correspondence between the target N thread and the connection FD by using the routing module, to obtain the target correspondence.

12. The communication method according to claim 10, wherein after the determining, by using the routing module based on the connection FD, a network adapter queue and a NUMA node that corresponds to the target N thread, the method further comprises:

allocating a transmit queue to the connection FD in a memory of the NUMA node corresponding to the target N thread, wherein the transmit queue is used to record a memory address of data related to a write operation.

13. The communication method according to claim 12, wherein the sending a link establishment request and first data to the service side by using the network adapter queue and the NUMA node that corresponds to the target N thread comprises:

receiving, by using the routing module, a write operation initiated by a second W thread, wherein the received write operation carries the connection FD and the first data, the second W thread is one of a plurality of W threads corresponding to the target application, and when the second W thread initiates the received write operation, the connection FD is transferred by the first W thread to the second W thread;

writing, by using the routing module based on the connection FD, the first data into the memory corresponding to the target N thread;

writing a memory address of the first data in the memory into the transmit queue corresponding to the connection FD; and when the target N thread obtains the memory address of the first data in the transmit queue through polling, sending the first data in the memory to a network adapter.

14. A computing device, comprising one or more processors and a non-transitory computer-readable storage medium storing a computer program to be executed by the one or more processors, wherein the computer program comprises instructions that when executed, cause the one or more processors to perform operations based on a user-mode protocol stack and applied to a service side, wherein the service side comprises an application layer, the user-mode protocol stack, and a hardware layer, wherein a target application of the application layer corresponds to at least one W thread, each of the at least one W thread is a thread for processing data of the target application, wherein the user-mode protocol stack comprises a plurality of N threads, a routing module, and transmission control protocol hash tables that are in a one-to-one correspondence with the plurality of N threads, wherein each of the plurality of N threads is a user-mode protocol stack thread, wherein the hardware layer comprises a plurality of non-uniform memory access (NUMA) nodes and a network adapter, and wherein the plurality of N threads are in a one-to-one correspondence with the plurality of NUMA nodes, and the operations comprise:

obtaining a first correspondence by using the routing module, wherein the first correspondence comprises a correspondence between a listen file descriptor (FD) of a first W thread and a plurality of shadow FDs, the plurality of shadow FDs are generated in a one-to-one manner for the plurality of N threads, and the first W thread is one of the at least one W thread;

obtaining a second correspondence by using the routing module, wherein the second correspondence comprises a correspondence between a target N thread and a connection FD, and the target N thread is an N thread selected by the network adapter from the plurality of N threads when a communication connection to a client is established; and communicating with the client by using the routing module based on the first correspondence and the second correspondence, wherein the communicating with the client by using the routing module based on the first correspondence and the second correspondence comprises:

transferring, by using the routing module, the connection FD corresponding to the target N thread to the first W thread based on a correspondence that is in the first correspondence and that is between a shadow FD corresponding to the target N thread and the listen FD corresponding to the first W thread; and communicating with the client by using the routing module based on the connection FD and the second correspondence.

15. The computing device according to claim 14, wherein the obtaining a first correspondence by using the routing module comprises:

receiving, by using the routing module, a listen operation initiated by the first W thread;

generating the listen FD for the first W thread;

initiating a listen operation to each of the plurality of N threads by using the routing module, to obtain the plurality of shadow FDs corresponding to the plurality of N threads, wherein the plurality of shadow FDs are in a one-to-one correspondence with the plurality of N threads; and establishing the correspondence between the listen FD and the plurality of shadow FDs by using the routing module, to obtain the first correspondence.

16. The computing device according to claim 14, wherein the network adapter comprises at least one network adapter queue, and the obtaining a second correspondence by using the routing module comprises:

obtaining, by using the routing module, the connection FD generated by the target N thread to establish the communication connection, wherein the communication connection is established based on a link establishment request that is sent by the client and that is received by a first network adapter queue, and the first network adapter queue is one of the at least one network adapter queue; and establishing the correspondence between the target N thread and the connection FD by using the routing module, to obtain the second correspondence.

17. The computing device according to claim 14, wherein when there are a plurality of W threads corresponding to the target application, the communicating with the client by using the routing module based on the connection FD and the second correspondence comprises:

receiving, by using the routing module, a poll/extended poll (epoll) event initiated by a second W thread, wherein the poll/epoll event comprises the connection FD, the connection FD is transferred by the first W thread to the second W thread, the second W thread enters a sleep state after initiating the poll/epoll event, and the second W thread is one of the plurality of W threads corresponding to the target application;

determining, by using the routing module based on the second correspondence, that the connection FD corresponds to the target N thread, to wait for a wake-up event related to the target N thread; and after the second W thread is woken up, performing, by using the routing module based on the second correspondence, a read operation or a write operation related to the target N thread.

* * * * *